March 4, 1947. H. T. AVERY 2,416,809
SELECTIVE NORMALIZING MECHANISMS FOR CALCULATING MACHINES
Filed April 7, 1941 12 Sheets-Sheet 1

INVENTOR.
HAROLD T. AVERY
BY
ATTORNEYS

March 4, 1947.   H. T. AVERY   2,416,809
SELECTIVE NORMALIZING MECHANISMS FOR CALCULATING MACHINES
Filed April 7, 1941   12 Sheets-Sheet 2

INVENTOR
HAROLD T. AVERY
BY
ATTORNEYS

March 4, 1947. H. T. AVERY 2,416,809
SELECTIVE NORMALIZING MECHANISMS FOR CALCULATING MACHINES
Filed April 7, 1941 12 Sheets-Sheet 3

INVENTOR
HAROLD T. AVERY

ATTORNEYS.

March 4, 1947.  H. T. AVERY  2,416,809
SELECTIVE NORMALIZING MECHANISMS FOR CALCULATING MACHINES
Filed April 7, 1941  12 Sheets—Sheet 4
FIG. 6.
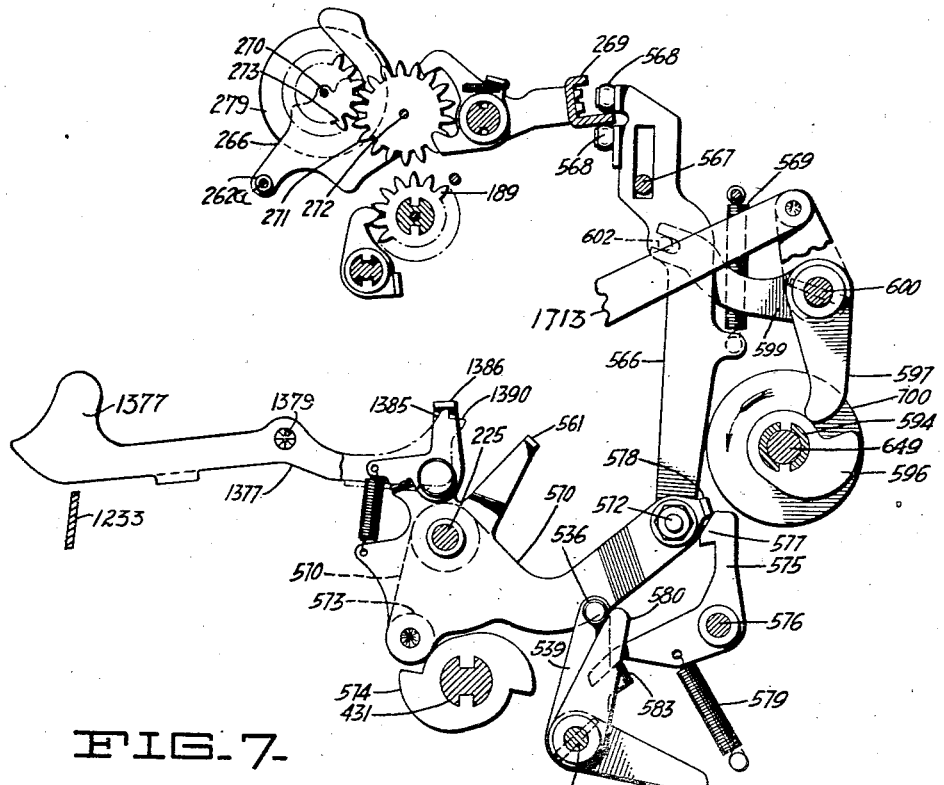
FIG. 7.
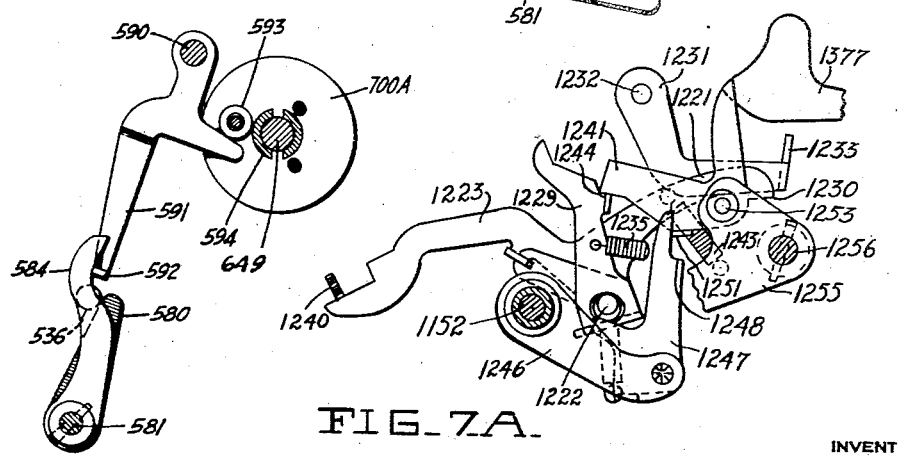
FIG. 7A.
INVENTOR
HAROLD T. AVERY
BY
ATTORNEYS March 4, 1947. H. T. AVERY 2,416,809
SELECTIVE NORMALIZING MECHANISMS FOR CALCULATING MACHINES
Filed April 7, 1941 12 Sheets-Sheet 5

INVENTOR
HAROLD T. AVERY
BY
ATTORNEYS

March 4, 1947. H. T. AVERY 2,416,809
SELECTIVE NORMALIZING MECHANISMS FOR CALCULATING MACHINES
Filed April 7, 1941 12 Sheets-Sheet 6

INVENTOR
HAROLD T. AVERY
BY
ATTORNEYS.

March 4, 1947. H. T. AVERY 2,416,809
SELECTIVE NORMALIZING MECHANISMS FOR CALCULATING MACHINES
Filed April 7, 1941 12 Sheets-Sheet 7
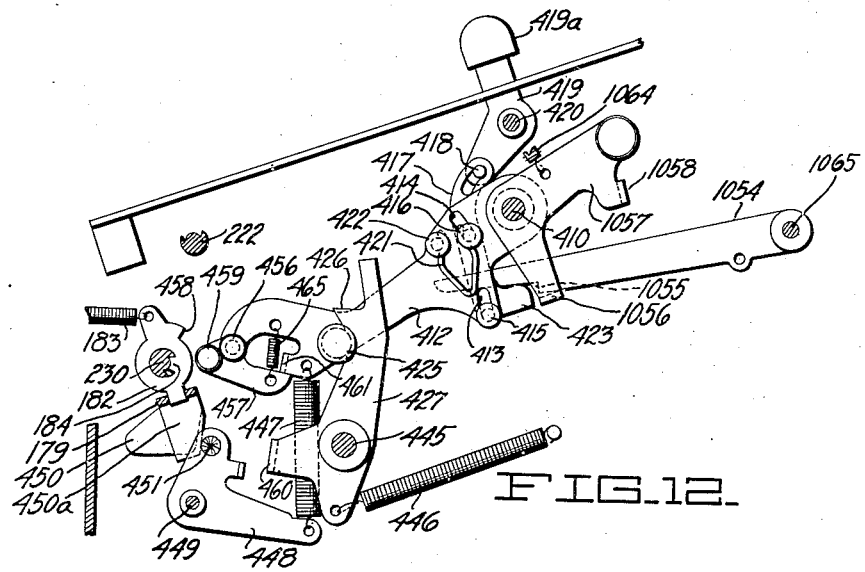
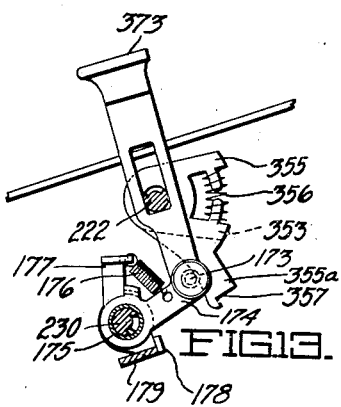
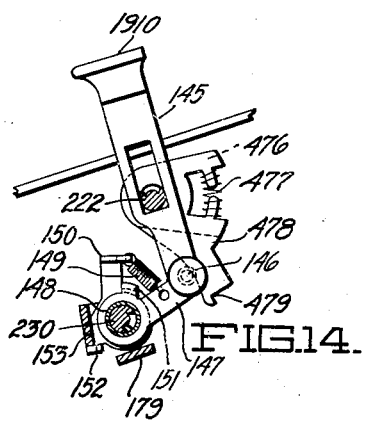
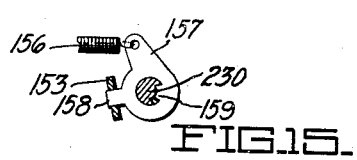
INVENTOR.
HAROLD T. AVERY
BY
ATTORNEYS.

March 4, 1947.  H. T. AVERY  2,416,809

SELECTIVE NORMALIZING MECHANISMS FOR CALCULATING MACHINES

Filed April 7, 1941  12 Sheets-Sheet 8

INVENTOR.
HAROLD T. AVERY
BY *Naylor and Lavagnino*
ATTORNEYS.

March 4, 1947. H. T. AVERY 2,416,809
SELECTIVE NORMALIZING MECHANISMS FOR CALCULATING MACHINES
Filed April 7, 1941 12 Sheets-Sheet 9
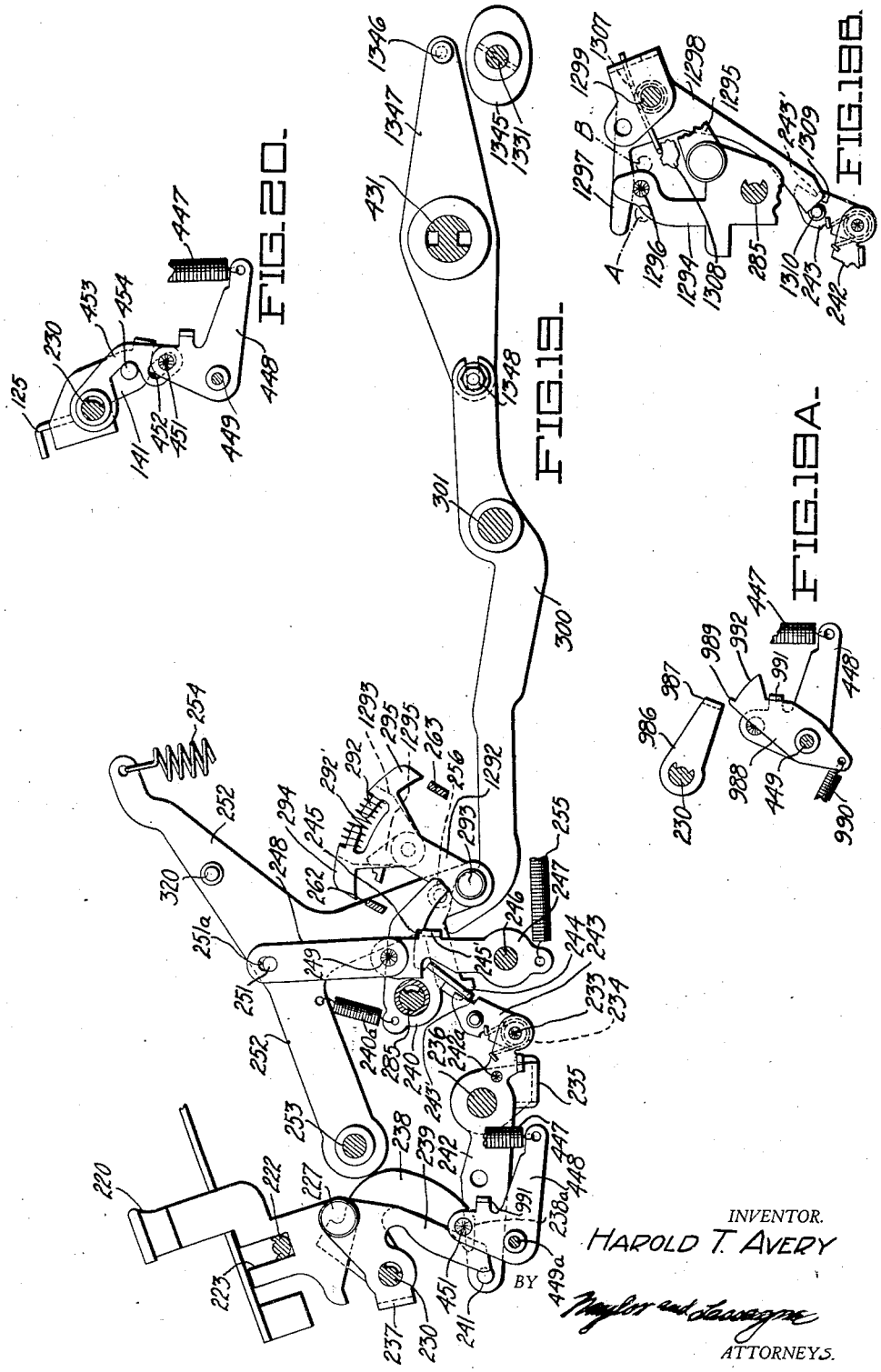
INVENTOR.
HAROLD T. AVERY
BY
ATTORNEYS.

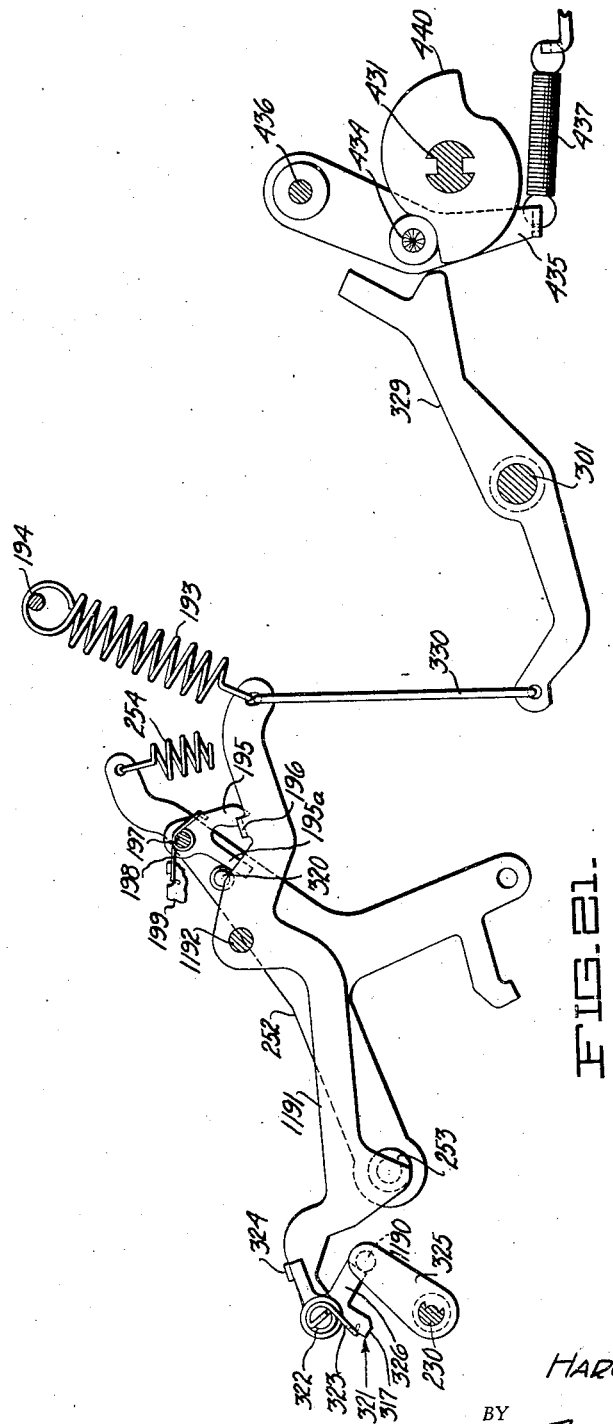

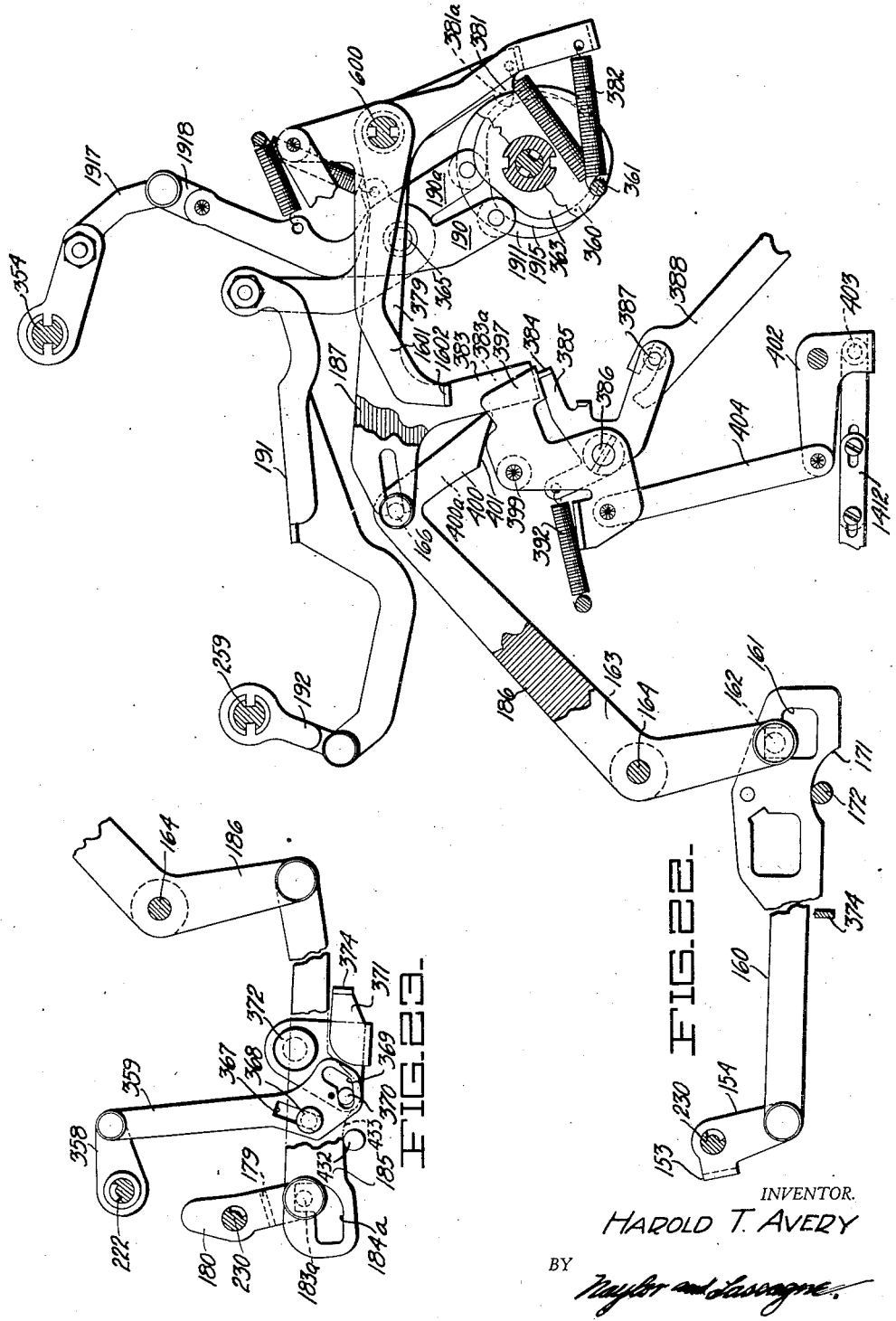

March 4, 1947. H. T. AVERY 2,416,809
SELECTIVE NORMALIZING MECHANISMS FOR CALCULATING MACHINES
Filed April 7, 1941 12 Sheets-Sheet 12
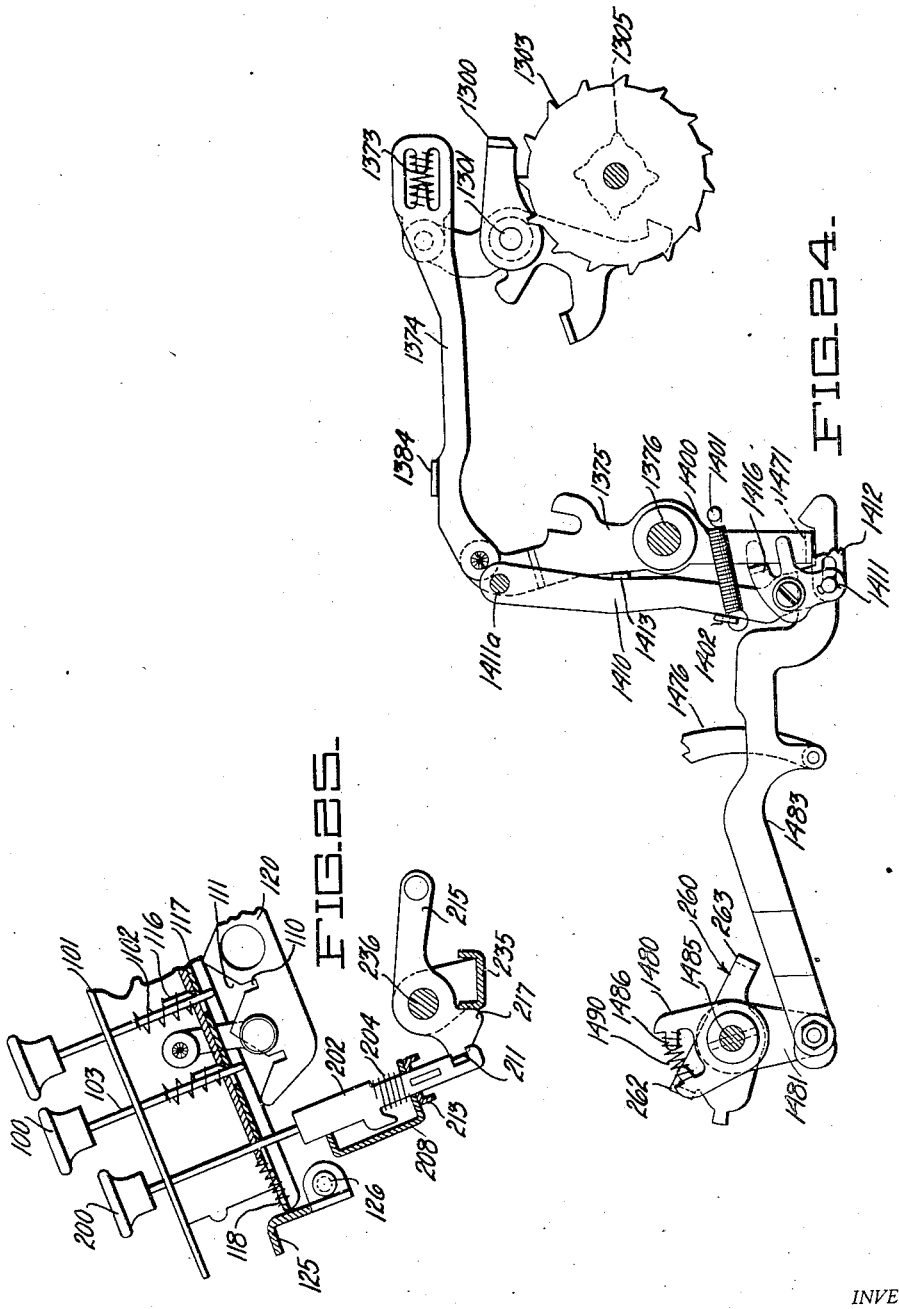
INVENTOR.
HAROLD T. AVERY
BY
ATTORNEYS.

Patented Mar. 4, 1947

2,416,809

UNITED STATES PATENT OFFICE 2,416,809

SELECTIVE NORMALIZING MECHANISMS FOR CALCULATING MACHINES

Harold T. Avery, Oakland, Calif., assignor to Marchant Calculating Machine Company, a corporation of California Application April 7, 1941, Serial No. 387,259

27 Claims. (Cl. 235—63)

The present invention relates to calculating machines and has particular reference to machines capable of performing automatic calculations, such as automatic multiplication, wherein a register carriage is automatically shifted from one position to the next during the course of the calculation. The particular embodiment of the invention disclosed herein is adapted to the commercially known Marchant calculating machine the general structure of which is disclosed in the Harold T. Avery Patent Number 2,216,659, issued October 1, 1940, and the tabulator mechanism of which is disclosed and claimed in the Avery Patent Number 2,365,324, issued December 19, 1944. Reference is had to the above patents for a complete disclosure of the calculating machine including mechanism not specifically disclosed herein.

It is to be understood, however, that the invention is not to be regarded as limited to application to machines or mechanism of the type set forth in the above patents. For example, although the invention is shown applied to a machine in which the shiftable carriage supports a register for movement relative to the actuating mechanism for the register, certain features of the invention will also be useful in calculating machines wherein the registers are stationary and the actuating mechanism is shiftable relative to the registers.

In calculating machines of the general class disclosed, the dividend and divisor of a division problem, or the multiplier and multiplicand of a multiplication problem are entered into the machine and the register carriage is shifted step by step from one ordinal position to the next during performance of the machine. At the termination of the automatic performance the carriage is in end position or in a position other than its starting position. Thus, in most cases where a repetitive series of calculation performances involving an automatic carriage shift are to be carried out, the carriage must be brought to a starting position at the beginning of each new calculation and the accumulator and/or counter registers must be cleared.

Also the selection mechanism, i. e., the keyboard, in which at least certain factors of the problem to be worked by the machine are set, must be cleared.

Heretofore these clearing and carriage reshifting operations have usually been accomplished by individually manipulating appropriate clearing and tabulator or carriage shift keys or the like to return the carriage to a starting position and to clear the selection mechanism and the various registers after each calculation.

It is the general object of the present invention to reduce the number of manual operations required after one machine calculation to condition a calculating machine for a subsequent calculation.

Another object of the invention is to facilitate selective conditioning of any of a series of independently operable machine conditioning mechanisms to be operated under the control of a master initiating device.

Another object is to enable a single manipulable member to render any of a series of machine conditioning mechanisms ineffective to be controlled by a master initiating device.

A further object is to selectively render a machine conditioning mechanism ineffective by releasably latching an initiating key therefor in partially depressed condition.

A further object is to provide means operable under control of any of a series of tabulator control keys for selectively effecting clearance of a keyboard and/or certain registers.

With a machine embodying the present invention it is possible to reduce the amount of time and effort on the part of a machine operator in conditioning a calculating machine for a problem by reducing the number of controls which must be manipulated by the operator. For this purpose, any or all of the various clearing mechanisms, i. e., the accumulator, counter, and keyboard clearing mechanism, may be arranged to be initiated by a master initiating device controlled by a single key, preferably a tabulator shift key. Thus, after depressing a tabular key indicative of a desired starting position of the carriage (upon termination of a calculation) the machine operator may direct his attention merely to the setting up of the next problem in the keyboard and the carriage will be automatically shifted to predetermined starting position while any or all of the clearance mechanisms will be operated to condition the machine to receive the factors of the next problem.

The present application also discloses means whereby the operation of the various machine conditioning mechanisms, such as the tabulator and clearance mechanisms, may be automatically initiated at the termination of a division performance; this subject matter being claimed in the Dustin and Avery Patent Number 2,377,767, issued June 5, 1945.

The manner in which the above and other objects of the invention are accomplished will be readily understood on reference to the following specification when read in conjunction with the acompanying drawings wherein:

Figures 6 and 7 are side views, illustrating the mechanism for dipping and latching the accumulator register driving gears with the actuator gears.

Figure 7A is a side view of the mechanism for disabling the shift control mechanism during the last operation of the division mechanism before stopping and for reenabling the same just before the machine comes to a stop.

Figure 12 is a side view with certain elements in section, illustrating the mechanism for initiating return of the carriage to a starting position and for initiating clearance of the accumulator register and keyboard at the termination of a division performance.

Figures 13 and 14 are similar sectional side views of the initiating key mechanisms for the accumulator and counter clearing mechanisms, respectively.

Figure 15 is a detail side view in partial section illustrating means for normally holding the counter clear bail in neutral position.

Figure 19 is a side view illustrating part of the tabulator control mechanism.

Figure 19A is a detail side view of means for preventing automatic clearance of the counter register at the end of a division performance.

Figure 19B is a detail side view of means for preventing tripping of the tabulator mechanism in the event that a tabulated shift is attempted with the carriage in a position to which a depressed tabulator key corresponds.

Figure 20 is a side view illustrating the mechanism for automatically clearing the keyboard at the termination of a division operation.

Figure 21 is a side view of part of the tabulator control mechanism and means operated thereby for rocking the clear bail shaft.

Figure 22 is a side view, partly in section, of the mechanism for clearing the accumulator and counter registers.

Figure 23 is a side view illustrating the linkage for releasing both the accumulator and counter clear links upon depression of the non-clear key.

Figure 24 is a side view of part of the shift control linkage.

Figure 25 is a side view, in section, illustrating an ordinal tabulator key and part of the keyboard mechanism.

General construction

Since the machine in which the present invention is embodied in its preferred form is disclosed in detail in the above mentioned Avery Patent Number 2,216,659 only a brief description of the operation of the same will be included herein.

Figure 1:
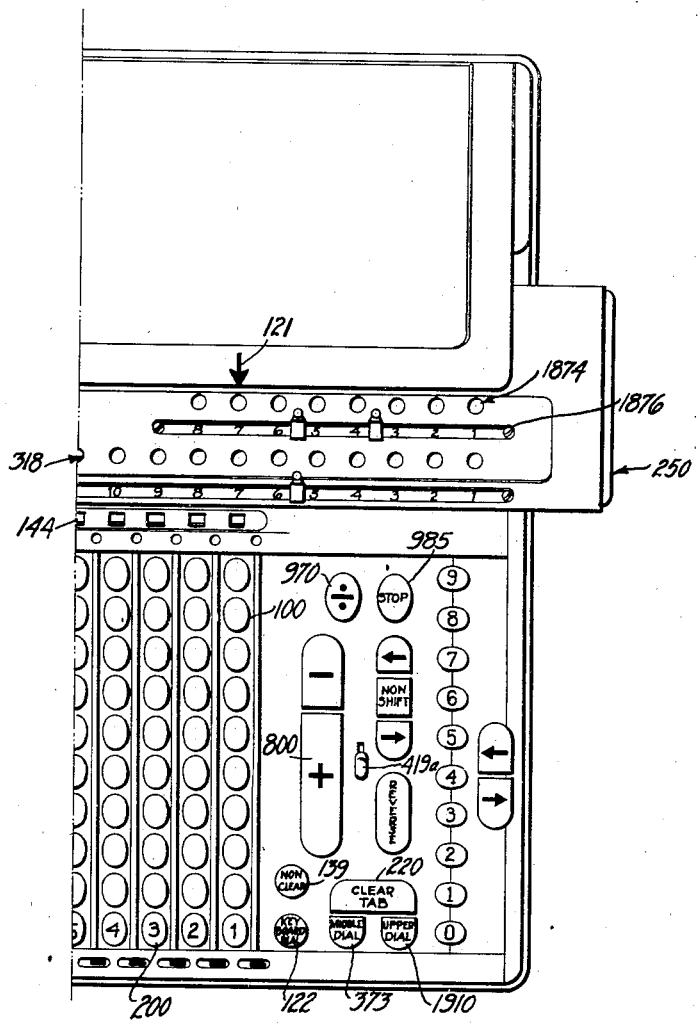
Figure 1 is a plan view of the right half of a calculating machine embodying the present invention.

The machine is of the proportional gear selective speed type wherein there is provided a series of gear combinations (not shown) of different gear ratios in each order. The usual banks of keys 100 (Figure 1) are provided, one for each order, to selectively effect connection of one of the gear combinations, depending on the value of a key depressed, to a cyclically operable main clutch 428 (Figure 3) and thereby transmit rotation to a series of ordinally positioned drive gears 189 (Figure 6). During actuation, intermeshing gears 273 and 271 supported on rods 270 and 272, respectively, carried by the carriage and aligned with the various ordinal gears 189 are entrained with these gears to transmit rotation to accumulator dials 279 forming an accumulator register 318 (Figure 1). As disclosed in the above mentioned Avery Patent Number 2,216,659, tens carry mechanism (not shown) of the duplexing type is provided to effect tens transfer.

The ratios of the various above mentioned gear combinations are such that, for each cycle of operation of the machine, the dials 279 will each be driven at a rate of speed proportionate to the value of the depressed key 100 in line therewith plus an added increment of one tenth of the amount of rotation of the next lower order dial. During subtractive operation, the direction of rotation is opposite to that which is effected during additive operation, but in either case the speed is the same when the selection is the same. Thus, during each cycle of operation of the main clutch 428 an amount corresponding to the amount set up in the keyboard will be entered additively or subtractively into the accumulator register 318 and, through mechanism not shown, the number of cycles of operation of the main clutch in each carriage position will be entered into a counter register 1874 also carried by the carriage so that during division the counter register 1874 serves to register the quotient of a problem.

Engagement of the main clutch is effected by a setting clutch 430 (Figure 2) keyed on a setting shaft 431 and adapted to be driven by the driving motor.

Setting clutch control

The setting clutch 430 is engaged through the instrumentality of any of a series of operation control keys such as the division key 970, and the add bar 800 (Figure 1), and when so engaged effects certain preliminary operations incident to the commencement of a calculation under power of the driving motor (not shown) besides causing engagement of the main clutch to effect actuation.

Figure 2:
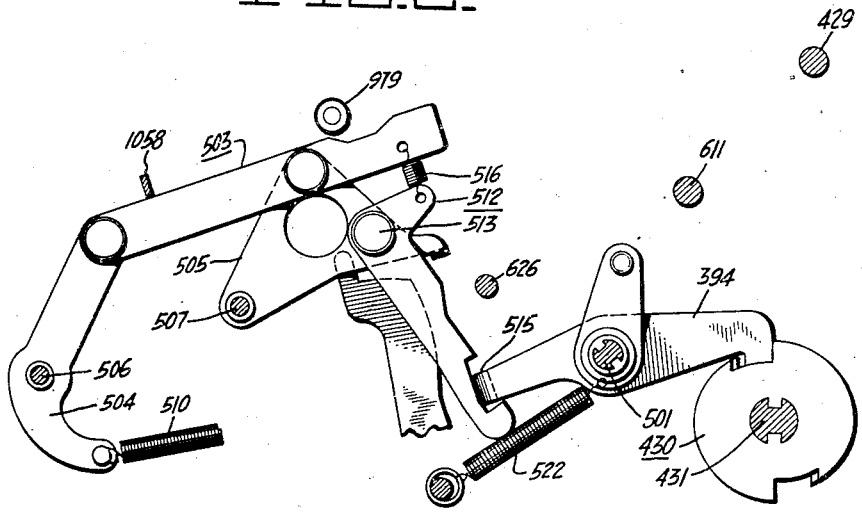
Figure 2 is a side view illustrating the setting clutch and controls therefor.

The setting clutch is normally held disengaged by a clutch dog 394 (Figure 2) which is keyed on a rockable shaft 501 and is urged clockwise by a spring 522 tensioned between the machine frame and the dog so as to urge its rightmost end, as viewed in Figure 2, into its illustrated position wherein it seats in one of a pair of notches formed in the clutch 430 and holds the clutch disengaged from the motor drive.

To permit operation of the setting clutch by any one of several operation control mechanisms, a depressible operating bar 503 is provided which is supported by a parallel link arrangement comprising a lever 504 pivoted to the machine frame at 506 and a plate 505 pivoted to the frame at 507. A spring 510 tensioned between the machine frame work and the lever 504 normally maintains the bar in its illustrated raised position. A bell crank 512 pivoted to the plate 505 at 513 is normally held by means of a tension spring 516, extending between the bell crank 512 and the bar 503, in a position wherein a notch formed on the lower end thereof embraces an ear 515 on the clutch dog 394 so that upon depression of the bar 503 the bell crank 512 will rock the dog 394 out of the engaged notch of the setting clutch 430 causing the clutch to rotate the setting shaft 431.

Mechanism (not shown) is provided to release the crank 512 from the ear 515 during the first cycle of operation of the setting clutch so as to limit this clutch to a single cycle of operation regardless of how long the bar 503 is held depressed.

Figure 5:
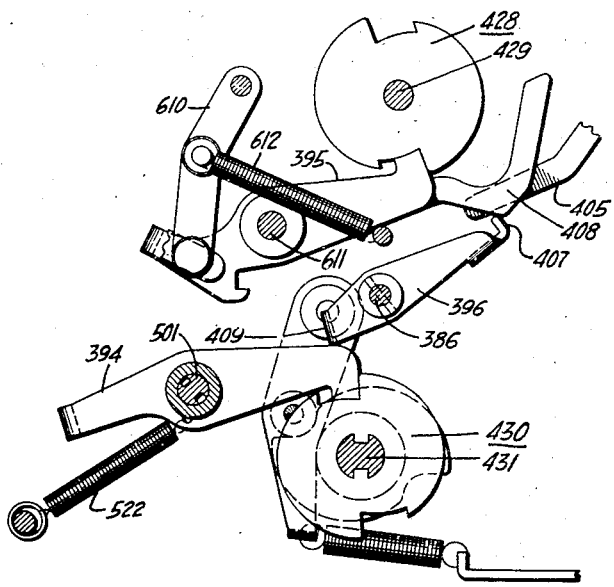
Figure 5 is a side view of the motor circuit control associated with the main clutch and the setting clutch.

Rocking of the setting clutch dog 394 effects closing of the motor circuit by virtue of engagement thereof with an ear 409 (Figure 5) formed on a lever 396 pinned to a shaft 386. The shaft 386 has a lever 397 pinned thereto (see Figure 22) which, upon being rocked clockwise as by the setting clutch dog 394, engages an ear 384 on a second lever 385 pivoted on the shaft 386 and normally held in its illustrated position by a spring 392 tensioned between the second lever and the machine frame. The lever 385 is connected through a pin and slot connection 387 with a motor switch operating arm 388 which is effective, upon being rocked from its illustrated position by the arm 385, to close the driving motor circuit.

*Main clutch control*

The main clutch 428 (Figure 3) is rotatably mounted on a rod 429 and is normally held disengaged by a clutch dog 395 pivoted on a shaft 611 and urged into contact with one of a plurality of diametrically opposed notches in the clutch by a spring 612 tensioned between the machine frame and a toggle linkage 610 connected to the clutch dog 395.

To effect engagement of the main clutch under control of the setting clutch a cam 747 is keyed on the setting shaft 431 and engages a cam follower roller 745 mounted on a lever 746 pivoted on the shaft 501 and spring urged into engagement with the cam. An interponent 603 is pivotally mounted at 604 on the lever 746 and is normally held in the position illustrated in Figure 3 by a tension spring 613 extending between ears formed on the interponent and the lever 746, respectively. The interponent 603 has a tip 615 which is adapted to engage a notch 616 on the main clutch dog 395 and thereby, when the shaft 431 is rotated, rock the dog 395 out from whichever notch in the main clutch 428 it was seated and thereby enable the main clutch to transmit rotation from the motor drive to the actuator mechanism including the gears 189 (Figure 6).

To provide for continued multicyclic operation of the main clutch in certain calculations, as for example division, a latch 632 (Figure 3) is provided which is pinned to a rockable shaft 626 and urged clockwise by spring 633 into engagement with an ear 620 on the clutch dog 395. When the clutch dog 395 is rocked clockwise in division and certain other calculations a roller 634 mounted on the upper end of the latch 632 moves into latching engagement with the under edge of ear 620 and thereby holds the main clutch dog 395 from moving into engagement with the main clutch 428.

The main clutch dog 395 also maintains the motor circuit completed during operation of the main clutch 428. Upon rocking of the dog 395 to effect engagement of the main clutch an extention 408 thereon (Figure 5) engages an ear 407 on the aforementioned lever 396 to rock this lever clockwise and thereby rock the switch control arm 388 (Figure 22) in the same manner as was described in connection with the control of arm 388 by the setting clutch dog 394 to complete the motor circuit.

It will be noted that the main clutch dog 395 is rocked clockwise to effect engagement of the main clutch before the clutch dog 394 is allowed to seat in one of the notches in the setting clutch 430 so that the lever 396 and shaft 386, and consequently the switch control arm 388, will be held rocked in a position to maintain the motor circuit closed throughout both the setting clutch cycle and the ensuing main clutch cycle or cycles without interruption.

*Dipping of accumulator register*

Upon rotation of the setting shaft 431 and in advance of actuation by the main clutch 428, the various accumulator drive gears 271 (Figure 6) carried by the shiftable carriage 250 (Figure 1) are enmeshed with the aligned actuator drive gears 189, described hereinbefore, this being accomplished by cams, one of which is shown at 574, keyed on the setting shaft 431.

The various sets of gears 271 and 273, as well as other elements (not shown) of the accumulator register, are carried on a series of plates 266 all pivoted by means of a rod 262a to the main body of the carriage and all are connected at their rightmost end, as viewed in Figure 6, to a common bail 269.

The means for raising and lowering the bail 269 to effect engagement and disengagement of the various gears 271 and 189 comprises a pair of links, one of which is shown at 566, slidable over pins 567 on spaced frame plates of the machine. Each link is provided with rollers 568 engaging the bail 269 on opposite sides thereof and is urged upwardly by a spring 569 tensioned between the links and a pin on the machine frame. The links 566 are pivoted at 572 to cam follower levers 570 rockable on a shaft 225, the levers 570 having rollers 573 engaging the cams 574 so that upon rotation of the shaft 431, the followers 570 and links 566 are moved to positively pull down the bail 269 against the action of the spring 569.

Means are provided to latch the accumulator register in its lower position during actuation.

This means includes latch levers 575 pivoted at 576 to the machine frame and urged by springs 579 into latching engagement with ears 578 on the cam follower levers 570. When the various plates 266 and the mechanism carried thereby are dipped the ears 578 ride over the noses 577 of the latch levers 575 and are latched therebeneath, thus retaining the gears 271 in mesh with the actuator gears 189 until termination of operation of the main clutch at which time the latches 575 will be released as will be described presently.

Referring to Figures 6 and 7, the means for releasing the latches 575 comprises levers 539 pinned on a rockable shaft coaxial with a shaft 581. On one of the levers 539 is a stud 536 engaged by an arm 580 pinned to shaft 581. Also pinned to shaft 581 is an arm 584 engaged by an ear 592 on an arm 591 pivotally supported on a shaft 590 and provided with an extension adapted to be engaged by a roller 593 carried by a supporting disc 700A which is fixed to a sleeve rotatably mounted on a shaft 649. This sleeve 594 is driven by a separate clutch which is operated only as an incident to termination of main clutch operations and is known as the "restore clutch."

When the main clutch dog 395 is moved to stop and disengage the main clutch 428 (Figure 5) the restore clutch 700 (Figure 6) to be described hereinafter, starts operation and rotates the disc 700A (Figure 7). Movement of the roller 593 rocks the lever 591 clockwise to rock the lever 584 and so rock lever 580, which engages the pin 536 on the juxtaposed lever 539. Lateral extensions 583 on the levers 539 engage and rock tails formed on the latches 575 releasing the ears 578 and allowing the springs 569, under control of the restore clutch, to return the accumulator register mechanism to an upper position.

The sleeve 594 of the restore clutch 700 carries a cam 596 (Figure 6) which is employed to prevent the carriage from rising too rapidly under the action of the springs 569 whenever the latches 575 are released. The cam 596 is engaged by a cam follower lever 597 fixed to a rockable shaft 600. A pair of arms 599 also fixed to the shaft 600 are joined by pin and slot connections 602 to the links 566 so that the rate of rise of the carriage under the pull of spring 569 is no greater than that permitted by rotation of the cam 596.

Restore clutch

The restore clutch 700 (Figures 4 and 6), besides effecting release of the carriage latch levers 575 and controlling the rate of return of the bail 269 and parts of the accumulator register to their upper positions also conditions certain of the division control mechanism, as will appear hereinafter, under the section entitled "Division control." The restore clutch is jointly controlled by the accumulator register dipping mechanism and by the main clutch dog in such a way that whenever the accumulator register is in its lower position and the main clutch dog 395 is seated in the notch of the main clutch, the restore clutch will engage and complete one cycle of operation.

The restore clutch is similar in construction to that disclosed in the patent to Friden Number 1,643,710, issued September 27, 1927, and is directly controlled by an extending nose 702 (Figure 4) on a clutch release dog in the form of a bell crank 405 which is freely supported on the shaft 600. An M-shaped lever 703 is provided to control the clutch release dog 405 and has one foot thereof pivotally mounted on the shaft 600.

A short arm 704 extending from the lever 703 is provided with a tenon on which is positioned a compression spring 705 extending between the arm 704 and the left arm of the clutch release dog 405.

An arm 722 keyed to the shaft 600, and thus rocked by dipping movement of the carriage, is connected to the M-shaped lever 703 by a combined compression expansion link unit 723, as disclosed in detail in the above mentioned Avery Patent 2,216,659. The link unit 723 is composed of a pair of links 715 and 716, the former pivoted at one end thereof on a stud mounted on the arm 722 and the latter link 716 pivoted at one end thereof on a stud extending from the lever 703. The two links slide relative to each other and have elongated slots at the free ends thereof each slidable over the pivotal studs for the other link. A compression spring 714 is inserted in a pair of coextensive apertures formed in the two links, being positioned over opposed tenons extending from each link, and opposes any attempt to lengthen or shorten the link unit beyond its normal length illustrated in Figure 4.

Now, at the start of a calculation, and as the setting clutch is rotated, the main clutch dog 395 is withdrawn from contact with the main clutch and an extension 408 of the dog 395 is withdrawn from beneath a latch lever 701 pivoted to the machine frame and urged counter-clockwise by a spring 717 tensioned between the latch lever and the machine frame. The latch 701 is therefore rocked counter-clockwise and an ear 718 thereon is rocked into a notch 719 formed in the M-shaped member 703 to prevent counter-clockwise movement of lever 703 until the main clutch has been disengaged by reseating of its dog 395 in one of the full cycle notches of the clutch 428. The lowering of the accumulator register mechanism (Figure 6), however, tends to engage the restore clutch even before the main clutch engages and a second restraining means is provided to prevent this operation.

The left foot of the lever 703 is provided with a shelf 720 overlying one end of a bell crank 721, pivoted on the shaft 611, and having a roller 707 at the other end thereof in engagement with a cam 708 keyed on the setting shaft 431. On rotation of the setting clutch, therefore, the bell crank 721 is rocked to raise the lever 703 and thus insure that the ear 718 of the latch member 701 will be able to engage the notch 719 properly when the main clutch is engaged. As the setting clutch continues through a single cycle of operation the cams 574 (Figure 6) effect dipping of the accumulator register mechanism and, consequently, the shaft 600 is rocked counter-clockwise. Therefore, the arm 722 (Figure 4) keyed to the shaft 600 is lowered and the link unit 723 is lengthened against the opposition of its spring 714. The parts remain so positioned with the spring 714 compressed until the main clutch dog 395 is permitted to reseat in a notch of the clutch 428 whereupon the extension 408 thereon strikes the ear 710 of the latch lever 701, rocking it clockwise and removing its lug 718 from the notch 719 of the lever 703. Spring 714 then expands shortening the link unit 723 and rocking the member 703 counter-clockwise to carry the left leg (Figure 4) of lever 703 down against the leftwardly extending arm of the bell crank 405 to rock this lever counter-clockwise and remove the nose 702 thereon from engagement with the restore clutch 700, thereby enabling the clutch to become engaged.

Figure 4:
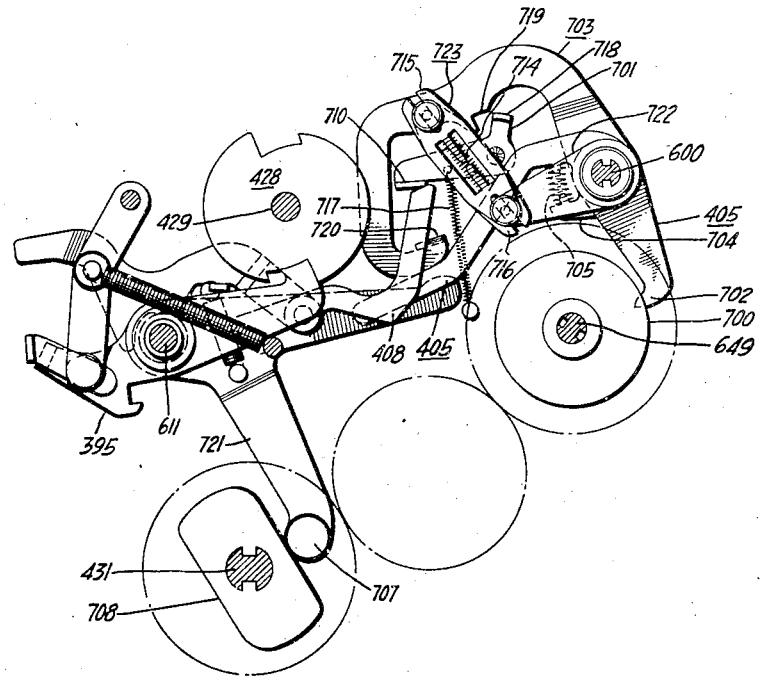
Figure 4 is a side view of the restore clutch and controls therefor.

Operation of the restore clutch, thus initiated, causes the latches 575 (Figure 6) to be released in the manner disclosed in connection with Figure 7 and controls the rate of rise of the links 566 through the cam 596, as previously described, enabling the springs 569 to rock the shaft 600 and arm 722 (Figure 4). This movement of arm 722 tends to compress the spring 114 which, being stronger than the spring 705, transmits a rocking movement to the link 723 and lever 703 to compress the spring 705 until the nose 702 of the restore clutch dog 405 can reenter into an aperture of the housing of the restore clutch 700, whereupon the restore clutch becomes disengaged and the mechanisms are brought to rest in the position illustrated in Figure 4.

The restore clutch dog 405, when moved counter-clockwise to effect engagement of the restore clutch 700, causes the motor circuit to be closed. This is accomplished by the leftwardly extending arm of the dog 405 (see Figures 4 and 5) which engages the ear 407 on the lever 396 and rocks the shaft 386, levers 397 and 385, and the motor circuit switch arm 388 in the same manner as does the main clutch dog 395. To insure that the motor circuit is held closed throughout the period in which the accumulator register is held dipped, a lever 1601 (Figure 22) is keyed to the shaft 600 and has an ear 1602 which, when the accumulator is dipped and the shaft 600 (Figure 22) rocked counter-clockwise, engages the ear 384 of lever 385 to insure that the switch arm 388 maintains the motor circuit closed.

Division control

Figure 11:
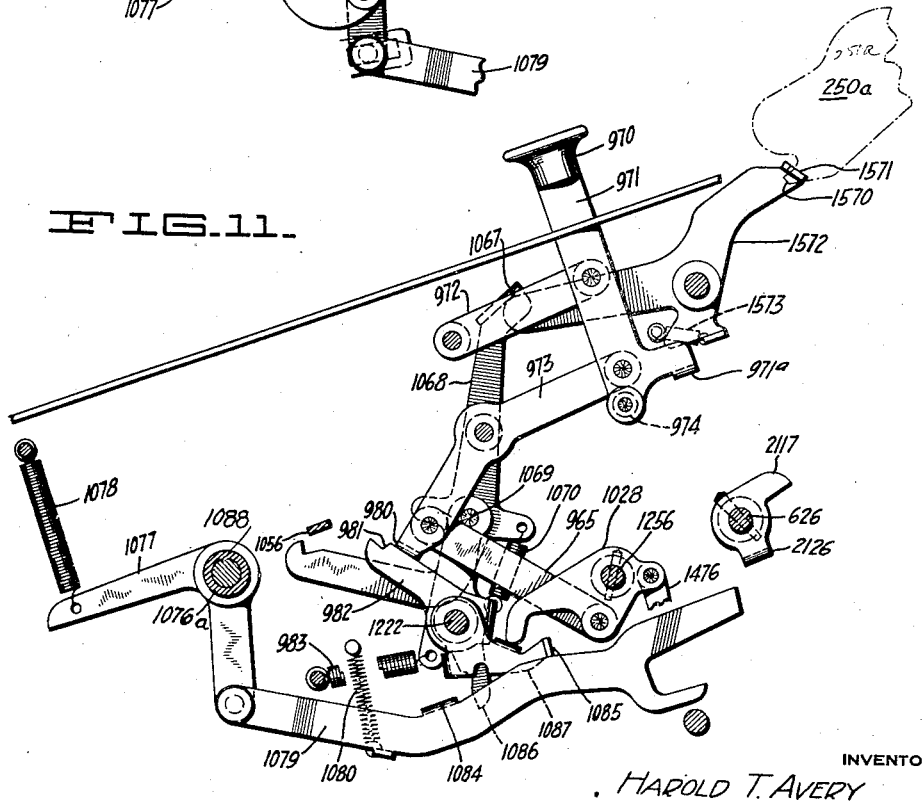
Figure 11 is a side view illustrating the control devices for terminating an automatic division performance.

As disclosed in detail in the above mentioned Avery Patent 2,216,659, division is performed by setting up the dividend in the accumulator register 318, as by the usual adding operation, and then setting up the divisor in the keyboard, and depressing the division initiating key 970 (Figures 1 and 11). The machine thereupon carries out automatically the operation of dividing the divisor into the dividend and registering the quotient in the counter register 1874 carried by the shiftable carriage 250. The operation consists of successive subtractions of the divisor from those digits of the dividend which are registered in orders of the carriage aligned with the portion of the selecting mechanism containing the divisor, and which may be called the "effective dividend." As the carriage is automatically shifted to the left, additional dividend digits in the accumulator register are successively brought into alignment with the part of the actuator mechanism controlled by the portion of the keyboard upon which the divisor is set until the carriage reaches its leftmost position. Since the construction and operation of the division control mechanism is described in detail in the above Avery Patent Number 2,216,659, only that part thereof which coacts with the mechanism of the present invention will be described herein.

Figure 9:
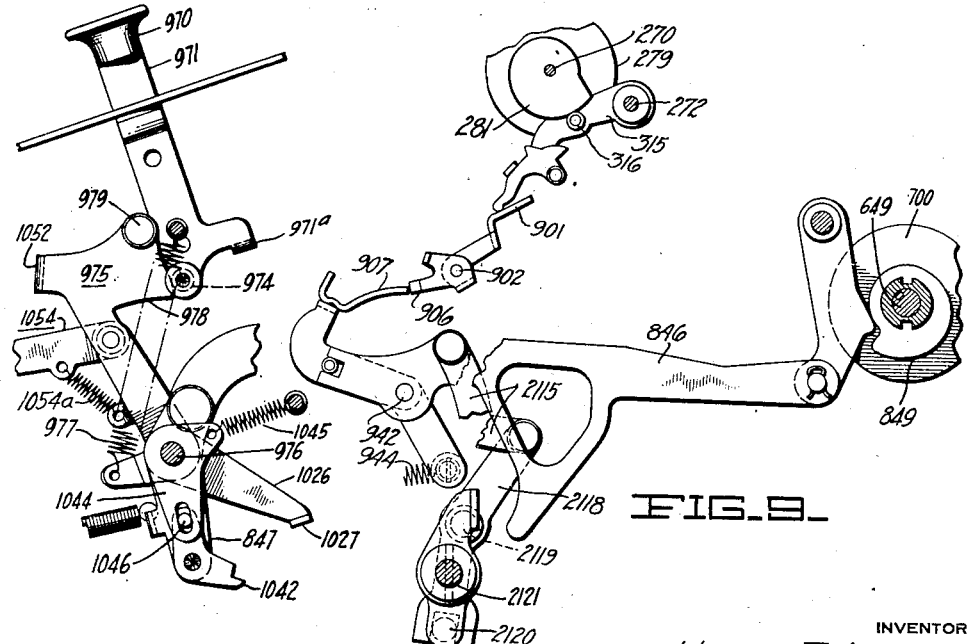
Figure 9 is a side view illustrating the control of the division control member by the division initiating key, the relationship between the division control member and the restore clutch mechanism, and the means operable by the accumulator register for tripping the main clutch dog latch.

The division initiating key 970 (Figure 11) is mounted on a key stem 971 supported by a pair of parallel levers 972 and 973 pivotally mounted on the machine frame. A roller 974 on the bottom end of the key stem 971 normally lies in front of a division control member 975 (see Figure 9). The member 975 is pivotally mounted on a shaft 976 and is urged clockwise by a strong spring 977 tensioned between an arm formed on the member 975 and a pin on the machine frame work.

When the division key is depressed the roller 974 passes beneath the face 978 on the lever 975 allowing the spring 977 to rock the member 975 clockwise until a roller 979 at the top of the member 975 strikes the main operating bar 503 (Figure 2) and, as described hereinbefore, depresses the bar to effect engagement of the setting clutch 430. As the key 970 is depressed to its lowermost position against the action of a tension spring (not shown) an extension 980 on the lever 973 is brought into alignment with a notch 981 on a latch 982, at which time the latch 982 is rocked by a tension spring 983, until this notch engages the extension 980 on the lever 973 to maintain the division key 970 depressed.

The setting clutch 430 (Figure 2), upon being initiated into operation by the division control member 975, will effect operation of the main clutch 428 (Figure 3), as previously disclosed, and the spring 633 will become active to hold the latch 632 in latching engagement with the main clutch dog 395 to enable multicyclic operation of the main clutch. The actuator mechanism including the gears 189 (Figure 6) are conditioned to operate in a subtractive direction by the depression of the division key 970 (in a manner not shown) so that the divisor set up on the keyboard will be subtracted one or more times from the dividend appearing in the accumulator register.

During rotation of the active accumulator register dials 279 (Figure 9) a snail cam 281 connected to each of the dials will be rotated in a clockwise direction, and a cam follower 315 pivoted on the rod 272 and following its respective cam by means of a roller 316 will depress a shelf formed on a sensing lever 901 pivotally supported at 902, thus rocking the lever 901 clockwise. A foot 906 on one or more of the levers 901 is normally engaged during division by a sensing bail 907 pivoted at 942 to the machine frame and urged clockwise by a spring 944 tensioned between the machine frame and an arm on the bail 907. A link 2115 is connected between an arm on the bail 907 and a lever 2118 pivoted at 2119 to the machine frame. The lever 2118 is connected through a pin and slot connection to an arm 2120 pinned on a shaft 2121.

Figure 3:
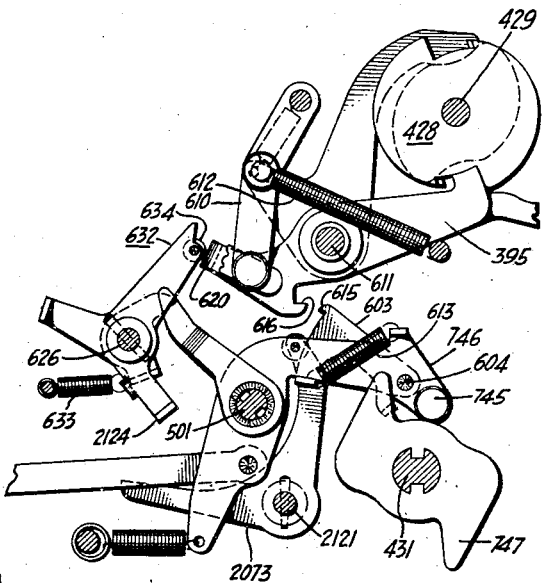
Figure 3 is a side view of the main clutch and controls therefor.

Referring to Figure 3, a bell crank 2073, also pinned on the shaft 2121, has a leftwardly extending arm underlying an ear 2124 of the main clutch dog latch 632, so as to engage and rock the latch 632 out from under the main clutch dog 395 upon tripping of the bail 907 by the sensing levers 901.

Now, since the position of the pivot 902 (Figure 9) of each of the sensing levers 901 is controlled by the size of the digits in the controlling orders of the divisor, as disclosed in detail in the above mentioned Avery Patent Number 2,216,659, when the remainder in the accumulator dials is reduced to approximately one-half of the divisor, the cam 281 in the controlling order of the accumulator will have forced its cam follower 315 and, consequently the corresponding sensing lever 901, to a position wherein the foot 906 on the sensing lever 901 passes above the rightwardly extending finger of the bail 907, permitting the spring 944 to rock the bail 907 clockwise and effect release of the latch 632 (Figure 3) to stop the main clutch.

It will be recalled that the main clutch dog 395 (Figures 4 and 5), when rocked home by its spring 612, will trip the latch 701 and allow the now extended link unit 723 to contract and rock the lever 703 and the restore clutch dog 405 counter-clockwise and enable engagement of the restore clutch.

During the restore clutch cycle and while the accumulator register is being raised, a link 846 (Figure 9) is moved to the left by a cam 849 driven by the restore clutch 700. A lever 847 pivoted on the shaft 976 and pivotally connected to the link 846 is rocked counter-clockwise. This lever 847 has a notched bell crank 1042 pivotally mounted thereon and adapted to engage an ear 1027 extending from the division control member 975. A second bell crank 1044, freely mounted on the shaft 976, has one end thereof provided with an elongated slot embracing a pin 1046 on the bell crank 1042. A spring 1045 tensioned between the other end of the bell crank 1044 and the frame holds the bell crank 1042 in position to engage the ear 1027 during the first part of the movement of the cam 849 (providing the division control member 975 has been rocked clockwise of its illustrated position by spring 977), but causes the bell crank 1042 to be rocked counter-clockwise relative to the lever 847 upon continued movement of the cam 849 (if the member 975 is maintained in its illustrated position) so as to override and miss the ear 1027.

The division control member 975 is pivotally connected at 1065 to a link 1054 (Figures 8, 9, and 12) urged counter-clockwise relative to the member 975 by a tension spring 1054a extending between the link and the member 975. Link 1054 has a shoulder 1055 adapted to engage an ear 1056 on a bell crank 1057 pivoted on a pin 410 and normally held in its illustrated position by a tension spring 1064 extending between the bell crank and the machine frame. An ear 1058 (see also Figure 2) on the bell crank 1057 overlies the setting clutch operating bar 503. When the member 975 is first rocked clockwise upon depression of the division key 970, the link 1054 is carried thereby to allow the shoulder 1055 to drop to a position behind the ear 1056 on the bell crank 1057. Now, upon the succeeding restore clutch cycle, the cam 849 (Figure 9) causes the member 975 to be rocked counter-clockwise back to its original position and during this time the shoulder 1055 of the link 1054 engages the ear 1056 to rock the bell crank 1057 clockwise against the action of the spring 1064, causing the ear 1058 to depress the setting clutch operating bar 503 (Figure 2) and initiate a "corrective cycle" as described in detail in the above mentioned Avery Patent Number 2,216,659, to correct for an overstroke if such has occurred. Means (not shown) are provided to release the link 1054 from engagement with the ear 1056 of the bell crank 1057 during the succeeding setting clutch cycle so as to allow the parts to return to their illustrated position.

When the division control member 975 is rocked counter-clockwise by the action of the restore cam 849, link 846, lever 847, and the bell crank 1042, it is retained in a leftward position by a latch lever 1050 (Figure 8) which is pivoted at the left thereof (in a manner not shown) to the machine frame and is spring pressed downward to engage an ear 1052 on the division control member. After completion of the corrective cycle and during the subsequent carriage shift the latch 1050 is released, as will be described presently, to allow the spring 977 to again rock the division control member 975 clockwise so as to initiate a new division operation in the new carriage position. It should be noted that the division key 970 (Figure 11) is still maintained in a depressed position at this time by the latch 982 and will, therefore, not interfere with the clockwise rocking movement of the division control member 975.

*Carriage shift control in division*

A complete disclosure of the carriage shifting mechanism and controls therefor will be found in the aforementioned Avery Patent Number 2,216,659, but will be briefly outlined herein to illustrate the connection thereof with the mechanism of the present invention.

Shifting of the carriage to the right or to the left is effected under motor power by rocking a control lever 1300 (Figure 24) about its pivot 1301 to one side or the other of its illustrated neutral position so as to engage one or the other of two ratchet discs 1303 and 1305 of a reversibly operable planetary carriage shifting mechanism. The control member 1300 is connected through a resilient connection 1373 to a link 1374 pivoted on a member 1375 rockable on a shaft 1376 and is normally held in its neutral position by a centralizer lever 1410 pivoted at 1411a to the machine frame and urged counter-clockwise by a centralizer spring 1400 tensioned between a machine frame stud 1401 and an ear 1402 on the centralizer lever 1410. The centralizer 1410 has an ear 1413 thereon engaging the lever 1375 above the shaft 1376 and also has an adjustable projection 1416 secured thereon and engaging the lever 1375 below the shaft 1376.

An ear 1384 (see also Figure 8) is adapted to be engaged by a hook formed on a floating dog 1383 pivoted on a lever 1380 which is also pivoted on the shaft 1376.

When the division key 970 (Figure 9) is depressed, an ear 971a thereon engages the leftmost end of the dog 1383 and rocks the same counter-clockwise until it hooks the ear 1384. A floating shift control lever 1377 is pivoted at 1379 to the lever 1380 and the left most end thereof, as viewed in Figure 8, is weighted so that it tends to rock counter-clockwise about its pivot 1379.

Figure 8:
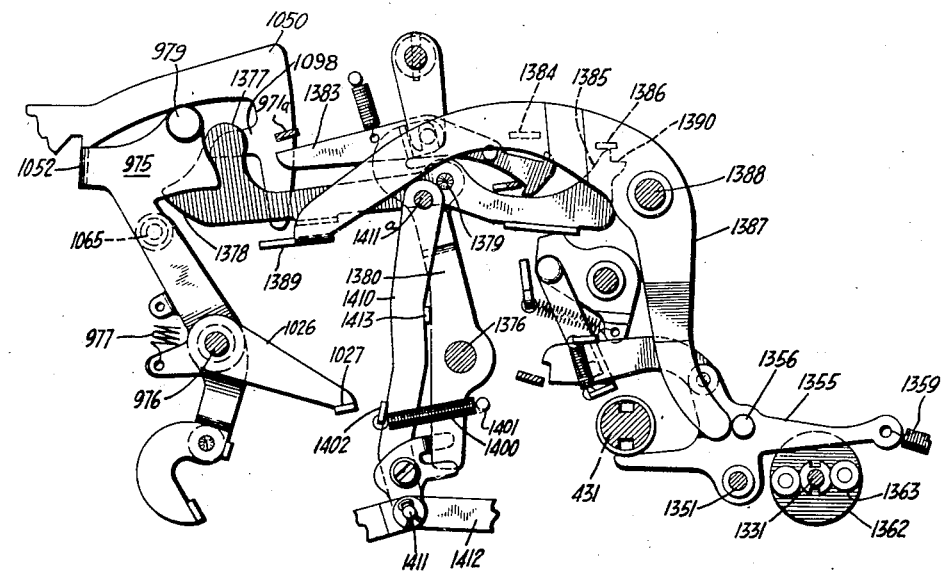
Figure 8 is a side view illustrating part of the division control mechanism, particularly that utilized in connection with control of the carriage shifting means.

At the end of a division operation in a particular carriage position, the floating carriage shift control lever 1377 is moved to the left, as viewed in Figures 6 and 8, to initiate a carriage shift to the left. During the division operation in a certain carriage position an ear 1386 on one of the cam followers 570 is moved to the right of its position illustrated in Figures 6 and 8 by virtue of the dipping movement imparted to the links 566 by the cam followers 570 when rocked by the cams 574 so that the weighted left end of the lever 1377 will rock the lever counter-clockwise until the notch 1390 formed by a shoulder 1385 on the right hand edge thereof embraces the ear 1386. Now, as the final restore clutch cycle ensues, enabling the springs 569 to lift the links 566 and rock the cam followers 570 counter-clockwise, the floating lever 1377 is shifted to the left by the ear 1386 and the dog 1383 is likewise shifted to the left through the action of the lever 1380. Since the dog 1383 is at this time hooked over the ear 1384 (Figures 8 and 24) of the shift link 1374, the shift control member 1300 will be rocked to engage the ratchet wheel 1305 of the planetary carriage shift mechanism to effect a leftward shift of the carriage.

It should be understood that the above carriage shifting operation takes place at the end of the final restore clutch operation in each carriage position following the "restorative" cycle instead of at the end of the first restore clutch operation. This is effected by reason of the fact that the division control member 975 is allowed to be held in a clockwise position by its spring 977 (in which case the roller 1065 thereon engages the under surface 1378 of the shift control lever 1377 to hold the same rocked to position the notch 1390 thereof below the path of movement of the ear 1386) until after the restore clutch has operated sufficiently to allow the cam follower lever 570 to have rocked counter-clockwise and thereby move the ear 1386 to substantially its illustrated position wherein it cannot engage the notch 1390 and shift the floating lever 1377. During the restore clutch cycle following the "restorative" cycle, however, the division control member 975, being latched in its counter-clockwise rocked position by the latch 1050, is ineffective to prevent initiation of the carriage shift.

During the initial shift cycle one of a pair of rollers 1363 (Figure 8) placed diametrically opposite each other on a disc 1362, which is rotated by a shaft 1331 connected to the planetary shift mechanism, rocks a lever 1355 pivoted to the frame stud 1351 against the action of a spring 1359, and a pin 1356 on this lever engages and rocks a bell crank 1387 pivoted to the machine frame at 1388. A shelf 1389 extending from the bell crank underlies the latch 1050 and the leftmost end of the link 1377 so that the lever 1377 will be rocked from engagement with the ear 1386 to limit the shift operation to one step, and the latch 1050 will be raised to release the division control member 975 which will then be free to rock toward the right to initiate the division operation in the new carriage order.

During the carriage shifting operation, the motor circuit is held closed by the shift centralizing arm 1410 (Figures 8 and 24). The lower end of centralizer lever 1410 is connected by a pivot pin 1411 to a link 1412 (see also Figure 22) which is also connected by the pivot pin 403 to a bell crank 402 pivotally supported by the machine frame and, in turn, connected by means of a link 404 to the combined interlock and motor circuit operating lever 397 pinned on the shaft 386. Thus, as the centralizer lever 1410 is rocked clockwise by the lever 1389, regardless of which direction this latter lever is rocked, the link 1412 will be pulled to the left effecting a clockwise rocking movement of the lever 397 which engages and rocks the lever 385 to operate the motor circuit arm 388 and close the motor circuit.

*Termination of operation in division*

The above repetitive tour of operations is repeated in each successive carriage position until the carriage reaches its leftmost position when further operation of the carriage shifting mechanism is prevented and the machine is brought to a standstill. As the carriage moves into its leftmost position, a projection 1570 (Figure 11) carried by the right hand carriage plate 250a strikes the under surface of an inclined cam face 1571 formed on the lever 1572 so as to rock the lever counter-clockwise against the action of a tension spring 1573 extending between the lever 1572 and the machine frame.

During division operation, with the carriage in its leftmost position, the division key will be unlatched and permitted to rise. A leftwardly extending arm of the lever 1572 underlies an ear 1067 on the upper end of a bell crank 1068 pivoted at 1069 to the division key latch 982. When the lever 1572 is rocked counter-clockwise by the carriage, the bell crank 1068 is rocked by a spring 1070, extending between the bell crank and part of the division key latch 982 to hook a leftward extension thereof around the ear 1056 of the bell crank 1057 (Figures 11 and 12). This bell crank, it will be recalled, is rocked by the link 1054, connected to the division control member 975, during the first restore cycle in each order for the purpose of initiating a corrective setting clutch cycle. If the end of the bell crank 1068 be hooked over the extension 1056 during such rocking, the bell crank 1068 will be pulled to the left rocking the latch lever 982 counter-clockwise about its supporting shaft 1222 to release the lateral extension 980 of the lever 973 and permit the division key 970 to be raised by a suitable spring (not shown).

Figure 10:
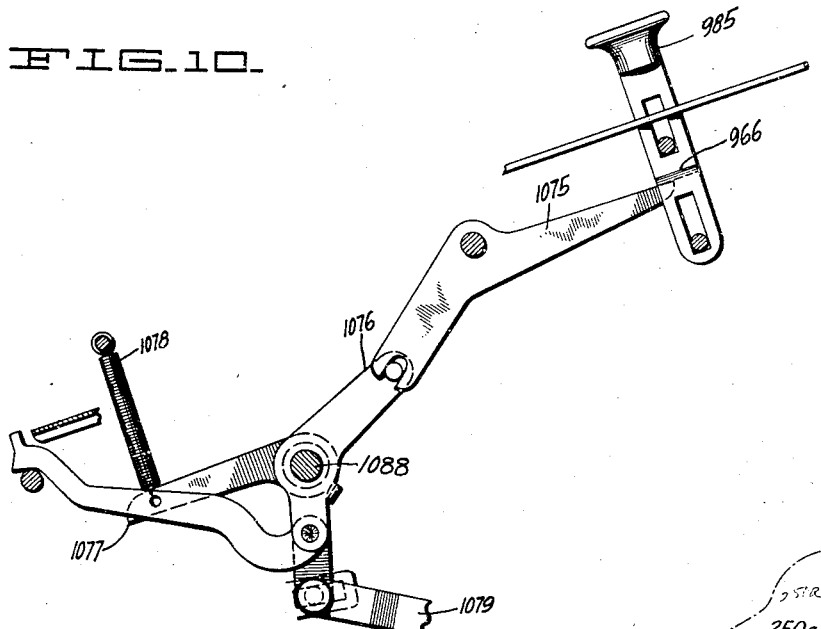
Figure 10 is a side view illustrating the stop key for interrupting a division performance at any time.

A division operation may be terminated at the conclusion of operation in any carriage position by a single depression of the stop key 985 leaving a quotient digit in that order accurately registered, or it may be terminated at once by two successive depressions of the same key which may possibly leave an inaccurate quotient digit in the counter. The stop key 985 (Figure 10) is slidably supported upon pins extending from the machine frame and is provided with an offset 966 which overlies a lever 1075 pivoted to the frame and connected by a pin and slot connection with a lever 1076 pivoted on a shaft 1088 and connected by means of a sleeve 1076a (Figure 11) with a bell crank 1077 which is normally urged in a clockwise direction by a tension spring 1078 extending between the bell crank 1077 and the machine frame. Upon depression of the stop key 985 the bell crank 1077 is rocked in a counter-clockwise direction and a link 1079 pivotally connected thereto and normally urged upwardly by a spring 1080, extending between a pin on the machine frame and the link 1079, is moved to the right. The link 1079 carries a shelf 1084 engageable with a tail 1086 of the division key latch 982 and is limited in its upward travel under tension of spring 1080 by an ear 1085 formed on a lever 1087. The lever 1087 is pivoted on the shaft 1222 which carries the division key latch 982, and has but a limited swinging movement relative to this latch so that for the present purpose it may be considered as an integral part of the latch. Upon depression of the stop key 985 the link 1079 is moved to the right carrying its shelf 1084 against the lower end of the tail 1086 of the division key latch 982. This swings the division key latch 982 counter-clockwise releasing the division key to rise slightly until its roller 974 (Figure 9) engages the underside 978 of the division control member 975.

Being released from the latch 982, the division key 970 is permitted to rise as soon as the division control member 975 has been moved to the position in which it is shown in Figure 8. This occurs during the next cycle of operation of the restore clutch and the roller 974 of the division key stem is then brought into blocking relation with the member 975 preventing operative movement thereof. As the division key rises, roller 974 thereon first moves in front of member 975 and then raises ear 1098 (Figure 8) on the latch member 1050 to release member 975 from the latch, leaving it restrained by roller 974 alone and ready for operation upon depression of the key.

A second depression of the stop key after the latch 982 has been tripped also moves the link 1079 to the right. It will be recalled, however, that upon the first depression of the stop key the latch 982 was moved in a counter-clockwise direction. Thus, the lever 1087 was swung upwardly and its ear 1085 permitted the link 1079 to rise under the action of its spring 1080. This rise of the link 1079 is sufficient to cause its right hand end to engage an ear 2126 on an extension of a lever 2117 fixed to the shaft 626 upon the second depression of stop key 985.

Referring to Figure 3, it will be recalled that the latch 632 is also fixed to the shaft 626 so that movement of this shaft by the link 1079 will effect release of the main clutch dog 395 and thus immediately arrest operation of the main clutch, and a restore clutch operation will ensue. The mechanism which is operated by the restore clutch for normally causing engagement of the shift clutch at the end of the operation in each order is disabled by the rise of the division key so as to not interfere with the operation of the automatic clearance and return shift mechanism described hereinafter.

A lever 1255 (Figure 7A) is fixed to the same shaft 1256 which carries the lever 1028 (Figure 11) connected to the division key linkage 965 and 973 described hereinbefore. The lever 1255 carries a latch 1241 (Figure 7A) which is urged counter-clockwise about its pivot stud 1253 by a spring 1243, so that upon depression of the division key and consequent clockwise rocking of shaft 1256 and lever 1255, the latch 1241 is moved toward the right from above an ear 1244 formed on an arm 1229 of a bail assembly freely pivoted on the shaft 1222, and the spring rocks the left end of the latch 1241 down and immediately to the right of the ear 1244. This bail assembly of which the arm 1229 is a part is urged clockwise about the shaft 1222 (Figure 7A) by a spring 1235, its movement in that direction being limited by engagement of an arm 1223 of the bail assembly with an ear 1240 on a member of the addition mechanism not shown. An ear 1230 is formed on a second arm 1221 of the aforesaid bail assembly and underlies a lever 1231, freely pivoted on a stud 1232, and provided with a portion 1233 underlying the left end of the shift control link 1377 (see also Figure 6).

The arrangement of the above described mechanism is such that when the division key is released and permitted to rise upon depression of the stop key or operation of the end position mechanism described hereinbefore, the shaft 1256 and lever 1255 are rocked counter-clockwise. The left end of latch 1241 lies substantially against the right side of ear 1244 at this time so that upon counter-clockwise rocking of shaft 1256, the latch pushes ear 1244 toward the left and rocks the bail assembly counterclockwise. The resulting upward movement of the ear 1230 rocks the lever 1231 upwardly, whereupon the lug 1233 on the latter lever engages the lower surface of the shift control lever 1377 and rocks the same upwardly or clockwise about its pivot stud 1379 (Figure 6). This moves the right end of the shift control lever down and out of the path of the ear 1386, so that leftward movement of the latter during the restore clutch cycle will not be effective to actuate the shift control link 1377.

Since the link 1377 must be freed so as to permit operation thereof for controlling the shift mechanism in other calculations, the above mechanism is adjusted to permit return of the link 1377 to active position soon after the ear 1386 has passed above and past the shoulder 1385 on the right end of link 1377.

This release is effected during the restore clutch cycle following the rise of the division key, this usually being referred to as the "second restore clutch cycle" which controls the operation of the following mechanism. As described in the Avery Patent Number 2,216,659, shaft 1152, and a lever 1246 fixed thereto (Fig. 7A), are rocked counter-clockwise under control of the restore clutch cam 596 (Fig. 6) and the linkage including link 1713. Lever 1246 carries an interponent 1247 (Figure 7A) which, upon such counter-clockwise rocking of lever 1246, moves upwardly, whereupon a shoulder 1248 of the interponent engages an ear 1251 on the latch 1241 and rocks the latter upwardly to the position shown, to release the ear 1244 from restraint of the latch and to permit return of the bail assembly and lever 1231 to the position shown. During the latter part of the upward movement of the interponent after the latch 1241 has released ear 1244, a portion of the interponent engages the shaft 1222 and rocks the interponent counter-clockwise about its pivot stud thereby removing the shoulder 1248 from beneath ear 1251 and releasing latch 1241 for downward movement under urge of the spring 1243 until blocked in the position shown by ear 1244.

During each restore clutch cycle the cam 596 actuates the lever 1246 as described above, but so long as the division key is in depressed position, the shaft 1256 and lever 1255 (Figure 7A) are held in their extreme clockwise position and latch 1241 stands in a position down and to the right of that in which it is shown, therefore upward movement of the interponent 1247 is ineffective throughout all restore clutch cycles in a division calculation except the one following the release of the division key. The interponent is also ineffective in the "first restore clutch cycle" in which the division key is released since release of the key is timed to occur subsequent to the upward movement of the interponent.

When the division key rises following restoration of the division control lever 975 (Figure 9) by operation of the restore clutch through what is known as "first restore cycle," the shaft 1256 is rocked counter-clockwise and latch 1241 is moved leftwardly against ear 1244 to rock arm 1229 and thereby disable the shift control lever 1377 as described in detail hereinbefore, so that no shift operation will be initiated by operation of the restore clutch during what is known as the "second restore cycle." The cam 596 (Figure 6) which normally initiates a shift operation by controlling the movement of ear 1386 and the shift control lever 1377 also controls the rocking movement of the lever 1246 and the mechanism for reenabling the lever 1377. The timing of the movement of these two mechanisms is such that before the interponent 1247 moves the latch 1241 upwardly far enough to release ear 1244, the ear 1386 (Figure 6) moves over the top of the shoulder 1385 of the shift control link 1377. After such movement the shift disabling mechanism described in detail above is released from restraint of the latch 1241 and returns to the position shown to reenable the shift control link 1377 so that it may subsequently initiate an automatic shifting operation as described hereinbefore.

*Tabulator mechanism*

The machine to which the present invention is applied includes a carriage tabulator shift mechanism whereby the carriage may be shifted to a selected one of a series of different carriage positions by the momentary depression of a tabulator key. The tabulator mechanism, with the exception of certain modifications disclosed herein, is described in detail in the above mentioned Avery Patent Number 2,365,324. However, the operation of the tabulator mechanism will be briefly described herein and certain of the changes which were made to adapt the tabulator mechanism to the mechanism of the present invention will also be described.

A tabulation of the carriage to a selected position may be obtained by depression of a correspondingly numbered one of a series of ordinally spaced tabulator keys 200 (Figure 1) arranged along the front of the machine, to its fully depressed position. For example, if an operator wishes to start a division, multiplication, or other calculation with the carriage in a "4" position, he may fully depress the "4" tabulator key 200 and the carriage will automatically be shifted to a position wherein the carriage indicating arrow 121, mounted on a stationary cover of the machine, points to the numeral "4" appearing on a decimal slide bar 1876 fixed to the carriage 250. As an alternative manner of effecting tabulation of the carriage to the "4" position, the operator may only partially depress the "4" tabulator key to a position wherein it is latched and thereafter depress a master tabulator key 220. Upon depression of any other columnar tabulator key 200, either partially or wholly, the previously depressed and latched columnar tabulator key will be released.

As shown in Figure 25, the lower end of each tabulator key stem abuts a respective sub-key stem 202 slidable in a fixed channel frame 208 and normally raised by a compression spring 204.

The tabulator key 200, shown in Figure 25, is illustrated in its partially depressed position wherein its sub key stem 202 is latched by a key locking slide 213 in a manner not shown. The sub-key stem 202 has a notch at the lower end thereof which engages an ear 211 of a lever 215 pivoted on a shaft 236, and forming part of a mechanism (not disclosed herein) for controlling the shifting movement of the carriage to a position corresponding to the number of the particular key 200 depressed, when such shift is initiated.

Upon depression of any tabulator key beyond a position illustrated in Figure 25, the lever 215 will be rocked further to cause a shoulder 217 thereon to strike and rock a bail 235 having arms at either end thereof pivotally suspended from the shaft 236, and it is this rocking movement of the bail 235 that initiates operation of the tabulator mechanism.

Initiation of operation of the tabulator mechanism is also accomplished by depression of the master tabulator key 220 illustrated in Figure 19. The stem of the master tabulator key 220 has a vertically extending slot 223 therein embracing a latching shaft 222 pivotally mounted in the machine frame. The stem of key 220 is pivoted is pivoted at 227 to a tabulator bail 237 pivoted on a bail shaft 230 also pivotally mounted in the machine frame. The bail 237 has two legs 238 and 239, the former of which has a camming edge 238a adapted, on depression of the tabulator key 220, to engage a pin 241 on a lever 242 which is pivoted on the shaft 236 and suitably connected to the bail 235 as by a rivet 242a. As the camming edge 238a engages the pin 241 it rocks the lever 242 counter-clockwise, rocking the bail 235 and initiating tabulation as will appear presently.

Pivotally mounted on the lever 242 by means of a stud 233 is a trigger 243 urged clockwise relative to the lever 242 by a torsion spring 234. A shoulder 243' is formed on the under edge of the trigger 243 and this shoulder is adapted to engage an ear 244 on a latch 240. Latch 240 is pivoted on a shaft 285 forming part of the mechanism for controlling the direction and extent of travel of the carriage, as described in detail in the above mentioned Avery Patent Number 2,365,324, and is normally urged clockwise by a tension spring 240a extending between a starting lever 252 and the latch 240, so as to hold a shoulder 245 on the bottom edge of the latch 240 in latching engagement with an ear 245' on a link 247 of a toggle arrangement comprising links 247 and 248. Link 247 is pivoted on a fixed stud 246 and is connected to the link 248 by a pin 249. The link 248 has an elongated slot 251a at the upper end thereof which embraces a pin 251 fixed on the starting lever 252. The lever 252 is pivoted to a fixed stud 253 and is urged downwardly by a powerful spring 254 tensioned between the starting lever and the machine frame.

When the links 247 and 248 are held latched by the latch 240, the pin 249 is slightly to the right (as viewed in Figure 19) of a line passing through the axes of the pin 251 and the stud 246 so that whenever the bail 235 is rocked counter-clockwise and the trigger 243 is raised the shoulder thereon will engage the ear 244, except under certain conditions as will appear later, and rock the latch 240 counter-clockwise against the action of the relatively weak spring 240a, to enable the spring 254 to rock the starting lever 252 downward, collapsing the toggle arrangement.

Pivoted to a depending arm of the starting lever 252 by a pin 293 is a T member 1292 having oppositely extending arms 294 and 295. The member 1292 is adapted to be positioned selectively with its arm 294 overlying an ear 262 (see also Figure 24) of a carriage shift controlling member 260, or with its opposite arm 295 overlying the ear 263 of the lever 260. Therefore, as the starting lever 252 moves downward upon being tripped, the T member 1292, depending upon its preset position relative to the arms 262 and 263 of the member 260, will rock the same a certain amount either clockwise or counter-clockwise and effect a carriage shift to the right or to the left as will appear presently.

Also pivoted on the pin 293 is a lever 1293 lying side by side with the T member 1292. The member 1292 and lever 1293 are each provided with an aperture at the top thereof into which are extended opposed tenons 292 forming guides for a compression spring 292'. The spring 292' under an initial compression tends to maintain the member 1292 and lever 1293 in their illustrated positions relative to each other and to return them to these positions in the event that they have been otherwise moved.

Connected between the lever 1293 and a lever 1294 (Figure 19B) fixed to the shaft 285 is a link 1295. As disclosed in detail in the above mentioned Avery Patent Number 2,365,324, the shaft 285 is rocked to one side or another of its illustrated neutral position by mechanism controlled jointly by the carriage and by a depressed columnar tabulator key 200 (Figures 1 and 25). That is, if a tabulator key 200, indicative of a desired carriage position to the right of the position which the carriage is occupying at the time, is depressed, the shaft 285 will be rocked a certain amount in a clockwise direction, as viewed in Figures 19 and 19B, to the effect that the T member 1292 will be rocked clockwise about its supporting pin 293 by the link 1295, lever 1293 and spring 292', so as to position its ear 295 directly over the ear 263 of the member 260 (Figure 24) and to remove its ear 294 from a position overlying the ear 262.

On the contrary, if a tabulator key 200 indicative of a desired carriage position to the left of the position occupied by the carriage is depressed, the shaft 285 will be rocked a certain amount in a counter-clockwise direction to the effect that the T member 1292 will also be rocked counterclockwise about its supporting pin 293 to position its ear 294 directly over the ear 262 of member 260 (Figure 24) and to remove its ear 295 from a position overlying the ear 263.

If a tabulator key 200 indicative of a carriage position corresponding to the position which the carriage is already occupying be depressed, the shaft 285 will be moved to its neutral illustrated position allowing the T member 1292 to assume a central position as illustrated. However, means are provided to prevent a tripping of the tabulator starting lever 252 by the trigger 243 (Figure 19) if the operator should accidentally cause this condition to occur.

Referring to Figure 19B, the lever 1294 is provided with a pin 1296 underlying a camming arm 1297 of a lever 1298 pivoted on a stationary pin 1299. A torsion spring 1307 extending between the lever 1298 and a portion of the frame work, fragmentarily indicated at 1308, urges the lever counterclockwise against the pin 1296. The lower end of the lever 1298 has a camming edge 1309 formed thereon, and when the lever 1294 is in its illustrated neutral position, the edge 1309 engages a pin 1310 on the hereinbefore mentioned trigger 243.

Assume that the tabulator key 200 corresponding to the carriage position which the carriage is occupying is depressed to its latched position so as to cause the lever 1294 to assume its neutral position shown in Figure 19B, and that the particular tabulator key 200 is depressed to its full extent or the master tab key 220 is depressed to rock the trigger 243 upward in an attempt to rock the latch 240 and thereby release the lever 252 in operation. Now, as the trigger 243 rises, the camming edge 1309 (Figure 19B) on the lever 1298 will guide the pin 1310 to rock the trigger 243 counterclockwise relative to its actuating lever 242 and thereby cause the shoulder 243' on the trigger to swing outward until it misses the ear 244 (Figure 19), a certain spacing being initially provided between the shoulder 243' and the ear 244 as indicated in Figure 19 to enable this action to occur. Therefore, the latch 240 will not be released from latching position.

Assuming that a tabulator key 200, other than the one corresponding to the carriage position which the carriage is actually occupying, be depressed, the lever 1294 will be rocked to one side or another of its illustrated position (Figure 19B), as above described, to move its pin 1296 into the position indicated by the dot and dash lines A or B. Therefore, since the under surface of the camming arm 1297 of the lever 1298 diverges upwardly from a central point, the spring 1307 will be allowed by the pin 1296 to rock the lever 1298 counter-clockwise an amount sufficient to position the camming edge 1309 on the under surface of the lever below the pin 1310 and thus not interfere with the operation of the trigger 243 as it is raised to engage the ear 244 of the latch 240 to rock the same.

Referring to Figure 24, the member 260 is secured to a rockable shaft 1485 to which is also secured a bifurcated arm 1480 having inwardly extending projections 1486 over which is compressed a spring 1490. The spring 1490 also extends over like projections on a juxtaposed bifurcated lever 1481 pivoted on the shaft 1485 and having a depending tail thereon pivotally connected to a link 1483 which has a notch normally embracing an ear 1471 on the lower end of the shift lever 1375. Thus, depending upon which way the member 260 is rocked by the T member 1292 (Figure 19) the lever 1375 will be rocked to one side or the other of its illustrated neutral position to institute a leftward or rightward shift of the carriage.

The link 1483 is held with the notch at its rightmost end embracing the ear 1471 of lever 1375 at all times except during division by a link 1476 (see also Figure 11) connected to a lever 1028 fixed on a rockable shaft 1256. Lever 1028 is connected to the division key supporting lever 973 by a link 965 so that whenever the division key 970 is depressed the shaft 1256 is rocked clockwise to depress the link 1476 and lower the notched end of the link 1483 below the ear 1471 of the shift controlling lever 1375. However, when the division key 970 is spring pressed into its raised position the shaft 1256 will be held rocked in a counter-clockwise direction to support the links 1476 and 1483 in raised positions wherein the link 1483 is effective to transmit movement to the lever 1375.

The carriage shift control linkage, illustrated in Figure 24, is held in a shift effecting position during the entire tabulating operation until the carriage reaches its preselected position at which time the linkage is released to allow the centralizer 1410 to return the same to a neutral position, this being described in detail in the above mentioned Avery Patent Number 2,365,324. However, during the first shift cycle the starting lever 252 (Figure 19) is returned to its illustrated raised position in readiness for initiation of operation of a subsequent tabulated shift. This is accomplished by a cam 1345 pinned on the shaft 1331 forming part of the shift mechanism and rotated thereby at the rate of one-half revolution per shift cycle.

The cam 1345 is adapted to engage the roller 1346 on a lever 1347 during the first shift cycle and thereby rock this lever about the setting shaft 431 on which it is pivoted. The lever 1347 is connected by a pin and slot arrangement 1348 to a lever 300 pivoted on a fixed stud 301 and having a cam surface at its leftmost end which underlies a roller 256 mounted on a pin extending from the starting lever 252 so as to impart an upward rocking movement to the starting lever to return it to its raised position.

The rise of the cam 1345 is preferably of such magnitude that the starting lever 252 will be substantially overcocked thereby, and the elongated slot 251a in the link 248 is provided for this purpose. Thus, a light spring 255 tensioned between the lower link 247 of the toggle arrangement and the machine frame is allowed time to become active to return the links 247 and 248 to their illustrated positions wherein they are locked by the latch 240. The spring 255 is much weaker than the spring 254 so as not to interfere with operation of the starting lever 252 at the start of a tabulation.

During the entire tabulated shift operation the motor circuit is held closed by action of the centralizer arm 1410 (Figure 24) which, as described hereinbefore, acts through the link 1412 (Figures 22 and 24), crank 402, link 404, levers 397 and 385, and the motor switch control arm 388.

*Keyboard clearance mechanism*

As shown in Figure 1, adjacent the master tabulator key 220 is a clear key 122, the depression of which releases all value selection keys 100 which are locked in a depressed position and enables all of a series of keyboard check dials visible through openings 144 in the carriage cover to return to zero.

The value keys 100 in each keyboard order (Figure 25) are mounted on key stems 103 slidably guided in a channel shaped key frame 101 and normally held in raised position by springs 102. When one of the keys 100 is depressed the lower edge of this key stem 103 impinges on one of the divergent sides 111 of a selection bar 120 to move the same lengthwise an amount proportional to the value of the particular key depressed. Upon full depression of the key its key stem enters an elongated notch 110 in the selection bar 120 to lock the bar in a fixed position. As described in detail in the above mentioned Avery Patent Number 2,216,659, the selection bar 120, upon movement thereof, rotates the various check dials to register a figure corresponding to the value of the numeral key depressed and also sets the selection mechanism to control the actuator mechanism accordingly. On the lower end of each key stem 103 is a lug 116 having a curved surface at the bottom thereof adapted to cam a lock bar 117, slidable on the under surface of the key frame 101, to the right, as viewed in Figure 25. The lug 116 moves its respective lock bar 117 against the action of a compression spring 118 until the lug 116 passes beneath the lock bar and then allows it to spring toward the left to a position wherein it overlies the lug 116, thereby locking the depressed key 100 against the action of the compression spring 102 until the lock bar 117 is again moved a sufficient amount to allow the lug 116 on the depressed key to clear the same.

All of the lock bars 117 may be simultaneously shifted to the right to free all depressed keys. This is accomplished by rocking a clear bail 125 extending across the machine and pivoted on coaxial studs 126 secured to the machine frame. The bail 125 may be rocked manually by the key 122 (Figures 1, 16 or 17), or automatically upon initiation of a tabulated shift, or automatically at the termination of a division performance as will be described hereinafter.

The key 122 (Figures 16 and 17) is mounted on a key stem 127 slidable over fixed pins 128 and urged upwardly by a spring 130 tensioned between the lower end of the stem and the machine frame. A roller 131 mounted on the key stem 127 overlies the camming surface 132a of a lever 132 pivoted on one of the shoulder studs 126 supporting the clear bail 125 and urged counter-clockwise by a tension spring 133 extending between the lever and the machine frame.

Pivoted to the lever 132 at 135 is an interponent 134 urged clockwise relative to the lever 132 by a hair spring 136 wound around a pin 129 fixed to the lever 132 and having the ends thereof extending into holes formed in lever 132 and interponent 134. The upper end of the interponent 134 is thus urged into engagement with the adjacent face of a camming arm 137 pivoted on a fixed stud 138. Normally when a non-clear key 139, to be described in detail hereinafter, is allowed to remain in its illustrated raised position, the arm 137 will assume its illustrated position in which case the interponent 134 will be held rocked clockwise an amount sufficient to position the lower end thereof over a shoulder 140 formed on an arm 141 extending from the common keyboard clear bail 125. Therefore, as the key 122 is depressed the roller 131 strikes the cam edge 132a of lever 132 and rocks the same against the action of its spring 133, the interponent 134 at this time engaging and rocking the arm 141 and clear bail 125 to release all depressed value keys 100. The conformation of the cam edge 132a is such that a minimum amount of force is required by the operator to effect clearance of the keyboard.

*Clearance of accumulator and counter register dials*

The accumulator and counter dials are cleared by power derived from the motor, instead of manually as in the case of the keyboard and keyboard check dals. Keys 373 and 1910 (Figures 1, 13, and 14) are provided to individually control motor driven clutches to effect this clearance of the dials.

The "upper dial" or counter clear key 1910 (Figure 14) for controlling clearance of the counter register dials 1874 (Figure 1) is secured to the upper end of its key stem 145 which is slidable over the latching shaft 222 and pivoted at 146 to an arm 147 which is journaled on a bushing 148 supported by the bail shaft 230. A tension spring 149 is extended between the arm 147 and a lever 150 also journaled on the bushing 148 to normally maintain the lever 150 against an ear 151 formed on the arm 147. The lower end of the lever 150 has an ear 152 formed thereon underlying a counter clear bail 153, the arms of which, as indicated at 154 (Figure 22), are journaled on the bail shaft 230. The bail 153 is resiliently held in its illustrated position by a spring 156 (Figure 15) tensioned between the upwardly extending arm of a lever 157 and the machine frame. It should be noted that the spring 156 is weaker than the spring 149 (Figure 14) so as not to overcome the latter. Lever 157 is mounted on the bail shaft 230 being provided with a tail 158 extending snugly into a slot formed in the bail 153, and a key portion 159 extending into a keyway formed in the bail shaft 230. It will be noted, however, that the keyway of shaft 230 is wider than the key portion 159 by an amount sufficient to enable the bail 153 and lever 157 to be rocked clockwise by the clear key 1910 in initiating operation of the counter clearing mechanism, without driving the shaft 230 from its illustrated position. However, the spring 156 tends to cause the lever 157 to maintain the shaft 230 in its illustrated position and to return the same to this position if it has been rocked clockwise therefrom.

Referring to Figure 22, a link 160 is pivoted to the lower end of the bail arm 154 and has an L-shaped aperture 161 at the rightmost end thereof in which is disposed a pin 162 on a bell crank 163 pivoted to a fixed stud 164. The bell crank 163 is connected by a pin and slot arrangement 166 to a clear lever 379, in the form of a bail pivoted on the aforementioned shaft 600 and carrying a clutch control tooth 381a normally held in engagement with a cyclic one revolution clutch 1911 of a type similar to that shown in the above mentioned Friden Patent 1,643,710, to maintain the clutch disengaged.

Upon depression of the clear key 1910, the bail 153 is rocked to effect clockwise rocking of the bell crank 163 through link 160 so as to rock the clear lever 379 counter-clockwise against the action of a tension spring 382 extending between the lower end of the lever 379 and a fixed pin 361. The tooth 381a is thus released from the clutch 1911 permitting the same to be engaged.

Secured to the driven side of the clutch 1911 is a cam 1915 engaged by a cam follower 190a pivoted on a fixed stud 365 and connected by a link 1916 with an arm 1917 splined to a counter clear shaft 354 slidable therealong and carried by the carriage. Thus, upon rotation of the cam 1915, the cam follower 190a will be rocked to transmit a rocking movement to the shaft 354, regardless of the position of the carriage and, as disclosed in detail in the Avery Patent 2,211,736, issued August 13, 1940, will clear the counter register dials.

Means are provided to prevent more than one revolution of the cam 1915 for each depression of the clear key 1910, even though the operator may hold the key depressed. The lower edge of the link 160 is curved, as shown at 171, and rides on a pin 172 extending from the machine frame, so that as the link 160 is moved to its leftmost position, as viewed in Figure 22, on depression of the clear key 1910, the right hand end of the link is raised to a position in which the pin 162 is disposed in the lower part of the L-shaped aperture 161, thus freeing the pin 162 from restriction and permitting the tension spring 382 to become effective to move the lever 379 with its tooth 381a into contact with the periphery of the housing of clutch 1911 until the clutch completes its cycle, at which time the tooth 381a drops into a recess in the clutch housing and disengages the same.

When the operator releases the clear key 1910, the spring 156 (Figure 15) returns the counter clear bail 153 and link 160 to the right until the link can again drop by gravity into the position shown in Figure 22.

During a clearance operation a leg 383 formed on the clear lever 379 is rocked downward against the ear 384 of the switch control lever 385 to complete the motor circuit by rocking the motor switch control arm 388.

A leg 400 is provided on the bell crank 163 and, as the bell crank is rocked to initiate a clearance operation, the leg 400 is moved down behind a roller 399 mounted on the aforesaid lever 397, thus forming an interlock to block operation of the setting clutch by maintaining the lever 396 (Figure 5) against the setting clutch dog 394. Also, through the linkage 404, 402, 1412, etc. (Figures 22 and 24), connecting the shift control linkage with the lever 397, the shift mechanism is prevented from operation until termination of a clearance operation.

Likewise, due to the fact that the lever 397 is rocked as described hereinbefore to a position wherein the roller 399 underlies the concave under surface 401 of the leg 400 during setting, main clutch, and carriage shifting operations, the crank 163 cannot be rocked completely through its path of travel to initiate a clearance cycle until the lever 397 is again rocked back to its illustrated position.

The clearance of the accumulator register 318 (Figure 1) is accomplished in the same manner as is the counter dials. The "middle dial" or accumulator key 373 (Figure 13) has its key stem slidable over the latching shaft 222 and pivoted by a pin 173 to an arm 174 journaled on a bushing 175 supported on shaft 230. A tension spring 176 yieldably connects the arm 174 to a lever 177, also journaled on the bushing 175 and having an ear 178 thereon extending behind an accumulator clear bail 179. The arms 180 of bail 179, as shown in Figures 23, are journaled on the bail shaft 230.

The key 373 and clear bail 179 are normally held in the position illustrated in Figures 12 and 13 by a tension spring 183 weaker than the spring 176 and extending between the machine frame and a lever 182 which has a tail fitted in a slot formed in the bail 179. Lever 182 is rockable on the bail shaft 230 and has a key portion 184 precisely similar in shape to that of key portion 159 (Figure 15), which permits rocking of the bail 179 by the clear key 373 in initiating operation of the clearing mechanism, without driving the shaft 230, but which urges the shaft 230, as well as the bail 179, to their illustrated positions if the shaft 230 has been rocked clockwise therefrom.

As shown in Figure 23, a stud 183a on the arm 180 of bail 179 is disposed in an L-shaped aperture 184a on a link 185 pivoted to a bell crank 186 supported on the pin 164 and connected to a clear lever 187 substantially similar to the lever 379. A tooth 381 of lever 187 normally engages an accumulator clear clutch 360, similar to that of 1911. The driven side of the clutch 360 is connected to a cam 363, rotation of which imparts rocking movement to a cam follower 190 about the pivot 365. The cam follower 190 transmits rocking movement to an arm 192 splined to an accumulator clear shaft 259 through a link 191. The shaft 259 is carried by the carriage and, upon rocking thereof, serves to return all of the accumulator dials to zero as described in detail in the above mentioned Avery Patent 2,211,736.

It will be noted that the lever 187 has a leg 383a identical in shape and purpose to that of 383 for controlling the motor circuit during clearance of the accumulator dials. Also a leg 400a, identical to that of 400, is provided on the bell crank 186 and is either blocked by or blocks the roller 399 on the lever 397.

It will be further noted that means are provided for preventing more than one revolution of the accumulator clearing cam 363 for each depression of the clear key 373. This means is similar to that used in connection with the counter clearing mechanism and comprises a frame pin 432 which is engaged by a curved camming surface 433 formed by a lug on the lower edge of the link 185. Thus, when the link is moved to its leftmost position, as viewed in Figure 23, upon depression of the clear key 373, the left hand end of the link is raised to a position in which the pin 183a is disposed in the lower part of the L-shaped aperture 184a, thereby freeing the pin from restriction and permitting the levers 186 and 187 to be spring operated to disengage the accumulator clear clutch at the end of its first cycle even though the clear key 373 be held depressed.

*Control of clearance initiating mechanisms by tabulator*

In accordance with the present invention, means are provided for automatically effecting operation of any or all of the clearance mechanisms described in the preceding section upon depressing any of the tabulator keys 200 or the master tabulator key 220 to effect a tabulation shift of the carriage.

Referring to Figure 21, means actuated by the hereinbefore described tabulation starting lever 252 are provided to initiate clearance of the various dials and keyboard. A clearance initiating lever 1191 is pivoted to a stud 1192 fixed to the machine frame, and is urged in a counter-clockwise direction by a relatively strong spring 193 tensioned between the lever 1191 and a stud 194 extending from the machine frame.

The lever 1191 is normally prevented from being rocked by spring 193 beyond its illustrated position by a latch 195 pivoted to a pin 197 extending from the machine frame and engaging at the lower end thereof an ear 196 on the lever 1191. The latch 195 is urged into latching engagement with the ear 196 by a torsion spring 198 extending between the latch and part of the frame fragmentarily indicated at 199. A tail 195a of the latch extends in the path of movement of a stud 320 secured to the starting lever 252.

A live point 321 in the form of a three-armed lever is pivoted to the leftmost end of the lever 1191 on a stud 322 fixed to the lever. A torsion spring 323, having one end thereof lying in a diametrically extending slot in the end of the stud 322, has the other end thereof extending around the arm 317 of the live point to urge the same counter-clockwise until a rightwardly extending arm thereon engages an ear 324 on the lever 1191 to maintain an arm 326 of the live point in a position overlying a long pin 1190 fixed to an arm 325 which is securely keyed to the bail shaft 230.

Now, assuming at this time that operation of all of the three aforesaid clearance mechanisms is to be automatically initiated upon depression of one of the tabulator keys 200 or 220, depression of such key will trip the starting lever 252, as described before, allowing the tension spring 254 to move the same downwardly to institute a tabulated shift of the carriage, and in so doing, the stud 320 strikes the tail 195a of latch 195 causing it to release the ear 196 at which time the tension spring 193 rocks the clearance initiating lever 1191 counter-clockwise. The live point 321 is now carried downwardly and the arm 326 thereon moves the pin 1190 to rock the arm 325 and bail shaft 230. The bail shaft 230, through the levers 157 and 182 (Figures 15 and 12, respectively) rocks the bails 153 and 179, respectively, against the combined forces of the springs 156 and 183 which are much less than that exerted by the spring 193. Thus, through the links 160 and 185 (Figures 22 and 23) the bell cranks 163 and 186 are urged clockwise to cause engagement of the accumulator and counter clear clutches. If, however, the tabulation starting lever 252 has, by this time, been lowered sufficiently to initiate a carriage shift, the lever 397 (Figure 22) will have been moved to a position wherein the roller 399 underlies the legs 400 and 400a of the cranks 163 and 186 preventing the same from completing the rocking movement to initiate clearance. The relative strengths of springs 193 and 254, the clearance between stud 320 and arm 195a and the angle of face 401 of leg 400 will determine whether carriage shifting will precede or follow the clearance operation, and this may be determined by appropriate design of these details. Assuming it to precede the clearance operation, the following operation will occur.

When the carriage has moved to its preselected position and the shift mechanism brought into a neutral position in a manner described in detail in the above Avery Patent Number 2,365,324, the lever 397 is, of course, returned to its original illustrated position by the linkage 404, 1412, etc., positioning the roller 399 forward of the path of movement of the legs 400 and 400a and permitting the spring 193 (Figure 21) to complete movement of the lever 1191, live point 321, lever 325, bail shaft 230, clear bails 153 and 179, links 160 and 185, cranks 163 and 186, and levers 379 and 187 to cause engagement of the clear clutches. As lever 1191 nears the end of its counter-clockwise rocking movement, the arm 317 of the live point 321 strikes the bail shaft 230 and cams the arm 326 from engagement with the pin 1190.

Clearance of the keyboard is also effected by rocking of the lever 1191. The pin 1190 (Figures 16 and 21) extends over the lever 132 and thus, as the arm 325 is rocked downward the pin 1190 strikes an upper edge of the lever 132 rocking the same clockwise and causing the interponent 134 to rock the keyboard clear bail 125 in the manner described hereinbefore.

The clearance initiating lever 1191 is recocked during the setting clutch cycle of the succeeding machine operation. This is effected by a centralizer cam 440 (Figure 21) keyed to the setting shaft 431 and engaging a roller 434 on a cam follower 435 pivotally mounted at 436. During the setting clutch cycle, the cam 432 is rotated by the shaft 431 to rock the cam follower 435 about its pivot 436 against the action of the tension spring 437 extending between the machine frame and the cam follower 435 and, in doing so, the roller 434 strikes the right hand end of a lever 329 pivoted on the shaft 301 and connected by a tie wire 330 to the lever 1191, thereby rocking the lever clockwise against the tension of the spring 193 until it is latched by the latch 195 ready to be again released at the initiation of the next tabulated shift of the carriage.

*Selective non-clearance control*

Means are provided to selectively render the tabulation controlled clearance initiating means, illustrated in Figure 21, ineffective to operate any or all of the three clearance mechanisms. This is accomplished by a single "non-clear" key 139 (Figures 1, 16, and 17) situated in juxtaposition with the "keyboard dial" clear key 122. Upon simultaneous depression of the non-clear key 139 and any of the clear keys 122, 373, and 1910, or upon holding the non-clear key 139 depressed while depressing any or all of the clear keys, latch mechanisms are brought into operation to disable the respective clear mechanisms and to latch them so that actuation thereof by the initiating means of Figure 21 is not possible.

Figure 16:
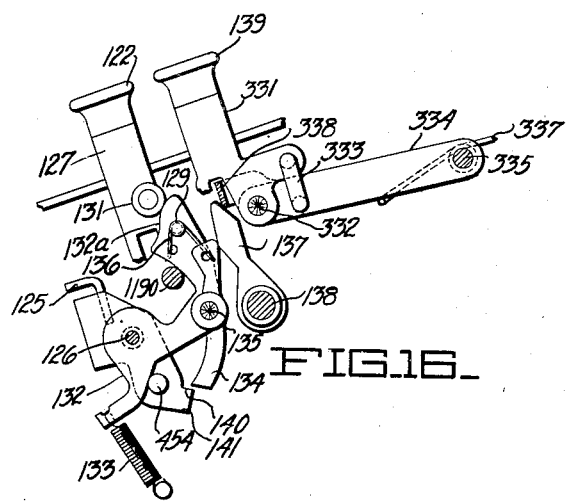
Figures 16 and 17 are side elevational views illustrating the keyboard clear key and the non-clear key and certain of the mechanisms controlled thereby.
Figure 17:
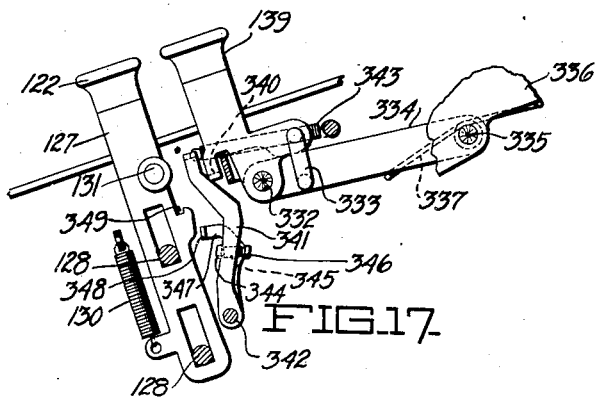

Referring to Figures 16 and 17 the key stem 331 of the non-clear key 139 is secured by a pin 332 and tie 333 to an arm 334 pivoted at 335 to a machine frame plate fragmentarily shown at 326 and urged clockwise by a torsion spring 337 to normally hold the key 139 in a raised position. Arm 334 has a long ear 338 thereon overlying the aforementioned camming arm 137 pivoted at 138 so as to rock the same counter-clockwise upon depression of the key 139. During the first part of the non-clear key stroke the ear 338 cams the arm 137 to such a position that it forces the interponent 134 counter-clockwise an amount sufficient to cause the lower edge to completely miss the shoulder 140 on the keyboard clear bail arm 141, if the keyboard clear key 122 is depressed simultaneously with key 139, or while the latter is held depressed.

Means are provided to latch the keyboard clear key 122 in a partially depressed position upon simultaneous depression of the clear key 122 and the non-clear key 139, or if the key 122 is depressed while the key 139 is held depressed. Formed on the non-clear key stem 331 is an ear 340 (Figure 17) engaged by the inclined edge of an arm 341 pivoted on a fixed stud 342 and urged clockwise by a spring 343 tensioned between the arm 341 and a frame stud. Arm 341 is yieldably connected to a latch arm 347, also pivoted on the stud 342, by a tension spring 345 extending between an ear 344 on the arm 341 and an ear 346 on the arm 347, the latter of which ears overlies the arm 341. As the non-clear key 139 is depressed, the ear 340 engages and cams the arm 341 counter-clockwise causing the same, through the spring 345, to yieldably urge the arm 347 in the same direction until an ear 348 thereon strikes the right hand edge (as viewed in Figure 17) of the clear key stem 127. Now, if the clear key 122 is depressed to a little less than its full stroke the ear 348 snaps into a hook 349 formed on the key stem 127, thereby latching the key 122 depressed.

Since, as before stated, depression of the non-clear key 139 causes the interponent 134 to be rocked clear of the shoulder 140 on the clear bail arm 141, it will be noted that when the key 122 is depressed to its locked position the interponent 134 will move downward alongside of the arm 141, but out of driving engagement therewith. The arrangement is such that upon simultaneous depression of both the clear key 122 and the non-clear key 139. the interponent 134 will be cammed off the shoulder 140 before the bail 125 can move the various key latching slides 117 (Figure 25) sufficiently to free any depressed value selection keys 100.

As soon as finger pressure is released from the key 139 it will be raised by the spring 337 leaving the key 122 latched depressed. Now, if clearance initiating lever 1191 (Figure 21) is tripped to rock the pin 1190 and arm 325 downwardly, the lever 132, already held in a clockwise position by the latched down key 122, will not actuate bail 125 because the lower end of extension 134 will be disposed below and beyond notch 140.

The key 122 may be released from its latched position by merely depressing the same to the full extent of its stroke at which time the spring 343, pulling the arm 341 against the ear 346 of the latch arm 347, rocks both arms clockwise until the ear 348 is clear of the notch 349.

Means are also provided to latch the accumulator clear key 373 (Figure 13) in a partially depressed position upon simultaneous depression of this clear key and the non-clear key 139 or upon depression of the key 373 while the non-clear key 139 is held depressed, and when so latched, the mechanism of Figure 21 will be ineffective to initiate clearance of the accumulator register.

Figure 18:
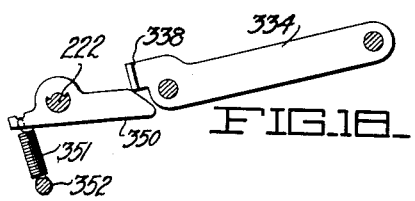
Figure 18 is a detail side view of the means for rocking the latching shaft by the non-clear key to enable latching of the accumulator and/or counter register clear keys.

Underlying the ear 338 of the arm 334 supporting the non-clear key 139 is a lever 350 (Figure 18) rigidly keyed to the latching shaft 222 and urged counter-clockwise by a tension spring 351 extending between the lever 350 and a frame pin 352. Also securely keyed to the latching shaft 222 is a bifurcated arm 353 (Figure 13) having opposed projections thereon over which is fitted a compression spring 356. The spring 356 is also fitted over identical projections of a second juxtaposed bifurcated arm 355 free on the shaft 222 and having a tail 355a thereon provided with a notch 357 at the lower end thereof. When the non-clear key 139 (Figures 16 and 17) is depressed and the shaft 222 is rocked clockwise thereby, the arm 353 is likewise rocked, compressing the spring 356 to urge the tail 355a of arm 355 against the pivot pin 173 connecting the clear key stem with the arm 174. Now, if the clear key 373 is depressed, either simultaneously with depression of the non-clear key 139 or while the key 139 is held depressed, the pin 173 will travel along the edge of the tail 355a of arm 355 until it passes the lower edge thereof at which time the spring 356 expands rocking the arm 355 to position the notch 357 over the pin 173 and latch the key 373 depressed.

Depression of the accumulator clear key 373 for the purpose of latching the same and rendering the accumulator clearance mechanism non-responsive to the clearance initiating lever 1191 (Figure 21) would, of course, institute a clearance operation. This may be undesirable under such circumstances and means are, therefore, provided to make it possible, selectively, to prevent a clearance operation. Securely keyed to the shaft 222 (Figure 23) is an arm 358 pivotally connected to the upper end of a link 359. An elongated slot 367 in the link 359 embraces a machine frame stud 368 to guide the lower end of the link 359, and a second angular slot 369 in the link 359 embraces a pin 370 on a lever 371 pivoted to a machine frame stud 372 and provided with an ear 374 (Figures 22 and 23) underlying both the accumulator and the counter clear links 185 and 160, respectively. As the non-clear key 139 is depressed to rock the shaft 222, the arm 358 is likewise rocked causing the link 359 to rock the lever 371 counter-clockwise at which time the ear 374 raises both links 160 and 185, rocking them about their respective pivots until the lower portions of the L-shaped apertures 161 and 184a, respectively, are brought into alignment with the pins 162 and 183a, respectively. Therefore, if key 139 is depressed before the accumulator clear key is depressed, the accumulator will not be cleared because, although the accumulator clear bail 179 is rocked by depression of the clear key 373, the pin 183a on the bail arm 180 merely rocks in the lower part of the aperture 184a and does not shift the clear link 185.

It will be recalled from the description headed "Control of the clearance initiating mechanism by the tabulator" that the shaft 230 is rocked clockwise by the mechanism shown in Figure 21 to cause operation of any or all of the three clearance mechanisms not disabled by the mechanism described above. It will also be recalled from the description of the accumulator clearance mechanism that the lever 174 (Figure 13) which is connected to the bottom of the key stem of key 373, is freely pivoted on shaft 230 and is yieldably connected to an upwardly extending arm 177 of the accumulator bail 179 by a spring 176 so that depression of the key rocks the accumulator clearance bail 179 clockwise. This rocking movement of the bail is limited by a projection 450a (Figure 12) on the bail to only that amount which will safely cause engagement of the accumulator clear clutch. The spring 176 then yields to permit an extra movement of the key to move the stud 173 below the lug which forms the front of the notch 357 and to allow the tail 355a to rock to key latching position.

Since the key 373 may be thus latched depressed with the bail 179 rocked clockwise and the pin 183a positioned in the lower leftmost portion of the L-shaped aperture 184a in link 185, the key portion 184 of the lever 182 (Figure 12) will be moved to engage the lowermost edge of the keyway in the bail shaft 230. If the clearance initiating lever 1191 (Figure 21) is now tripped and the shaft 230 rocked clockwise by the arm 325 upon striking of the pin 1190 by the live point 321, the upper edge of the keyway in the shaft 230 will not move the bail 179 because the latter will be held, by spring 176, with its projection 450a (Figure 12) in engagement with the machine frame. The key 184 will therefore act as a stop to prevent excessive rocking movement of shaft 230.

The clear key 373 is released from its latched position by merely depressing the same to the full extent of its stroke at which time the spring 356, previously compressed by the relatively stronger spring 351 (Figure 18) which returns the shaft 222 and arm 353 to their original illustrated positions upon release of manual pressure on the non-clear key 139, rocks the arm 355 counter-clockwise and removes its tail 355a from latching engagement with the pivot pin 173.

The counter clear key 1910 (Figure 14) is adapted to be latched in a partially depressed position to render the counter clear mechanism incapable of actuation by the clearance initiating lever 1191 (Figure 21) in a manner precisely similar to that employed in connection with the accumulator clear key 373. That is, upon simultaneous depression of the key 1910 and the non-clear key 139 (Figures 16 and 17), or upon depression of the clear key 1910 while the key 139 is held depressed, the key 1910 will be latched down. This is effected by a bifurcated arm 476 (Figure 14) keyed on the shaft 222 and connected through a compression spring 477 to a bifurcated arm 478 identical in construction and function with the arm 355, a notch 479 being provided at the lower end thereof to move into latching engagement with the pivot pin 146 provided at the lower end of the counter clear key stem 145.

When the non-clear key 139 is depressed the link 160 (Figure 22) is held raised as disclosed hereinabove through the instrumentality of the lever 371 (Figure 23) to position the lower part of the L-shaped aperture 161 of the link 160 in line with the pin 162 on the bell crank 163. Therefore, as long as the key 139 is held depressed, the link 160 may be shifted to the left by depression of the counter clear key 1910 and consequent rocking of the counter clearance initiating bail 153 without rocking the bell crank 163 to initiate clearance of the counter register.

Whenever the clear key 1910 is latched depressed, the bail 153 is normally rocked clockwise from its illustrated position and the lever 157 (Figure 15) is held with its key portion 159 engaging the bottom edge of the keyway in the shaft 230. Therefore, when the bail shaft 230 is rocked a limited amount, as hereinbefore described, by the clearance initiating mechanism, illustrated in Figure 21, it will be ineffective to rock the lever 157 and bail 153.

The clear key 1910 may be released from its latched position by merely depressing the same to the lower end of its stroke in the same manner employed to release the accumulator clear key 373.

*Automatic tabulation and clear at end of division*

Means are provided to automatically return the carriage to a pre-selected intermediate or end position and to clear the accumulator register 318 (Figure 1) and the keyboard at the termination of a division performance, whether such termination be effected in the ordinary manner by movement of the carriage to its leftmost position or by depression of the stop key 985 when the carriage is in any other position. The automatic control of the keyboard and accumulator clearing mechanism at the end of a division performance entirely supersedes the selective disabling controls discussed in the preceding section so that upon setting certain controls the keyboard and accumulator register dials will be cleared regardless of whether or not the clear keys 122 and 373 (Figures 1, 13, 16, and 17) have been latched down.

Referring to Figure 12, a lever 412 is pivoted on the frame stud 410 on which the bell crank 1057 described in the section headed "Division control" is also pivoted. Lever 412 has a pair of elongated slots 413 and 414 therein embracing studs 415 and 416, respectively, fixed to a link 417 which is connected by a pin and slot connection 418 to a lever 419. Lever 419 is pivoted to a frame stud 420 and the upper end thereof extends through a slot in the keyboard cover and terminates in a handle 419a whereby it may be manually set in either of two different positions. A toggle spring 421 extended between the stud 416 and a stud 422 on the lever 412 holds the lever 419 and link 417 in either of their two different positions, and when the link 417 is held in the operative position illustrated in Figure 12 a foot 423 on the lower end thereof is adapted to be engaged by the ear 1056 of the bell crank 1057 to rock the lever 412 clockwise as an incident to operation of the restore clutch. However, when the handle 419a is rocked to the right, as viewed in Figure 12, the link 417 is raised and the foot 423 thereon passes above the path of movement of the ear 1056, and the lever 412 is not rocked by the bell crank 1057. The automatic control of the tabulator mechanism and the keyboard and accumulator clearing mechanism at the end of a division performance is thus disabled.

When the handle 419a is moved to its illustrated operative position, rocking of the bell crank 1057 during the first restore cycle in division, as described hereinbefore, will cause the ear 1056 thereof to rock the lever 412 clockwise about the stud 410 until a stud 425 fixed thereon passes above a shoulder 426 formed on a latch 427 pivoted at 445 to the machine frame and urged counter-clockwise by a tension spring 446 extending between the latch and the machine framework, thereby allowing the latch to hold the lever 412 in a raised position.

As the lever 412 is rocked upward by the bell crank 1057 a spring 447 extending between the lever 412 and a bell crank 448, pivoted on a fixed stud 449, is tensioned tending to rock the bell crank 448 counter-clockwise. The upwardly extending arm of the bell crank 448 has a long pin 451 thereon adapted to engage a depending lug 450a on the accumulator clear bail 179 and thus rock the same to initiate a clearance of the accumulator register.

The pin 451 also extends into an elongated slot 452 (Figure 20) formed in an arm 453 journaled on the bail shaft 230 and lying directly behind a pin 454 (Figures 16 and 20) mounted on the keyboard clear bail arm 141 so that upon rocking of the bell crank 448 under the urge of spring 447, the pin 454 will be rocked by the arm 453 to rock the clear bail 125 and clear the keyboard in the manner described hereinbefore.

The pin 451, furthermore, extends directly behind the leg 239 (Figure 19) of the hereinbefore mentioned master tabulator bail 237 so that upon rocking of the bell crank 448 by spring 447 the tabulator bail 237 will be operated to trip the tabulation starting lever 252 in the manner described hereinbefore under the section headed "Tabulator mechanism" and thereby return the carriage to a selected position determined by whichever one of the tabulator keys 205 is latched in depressed condition.

Although the lever 412 (Figure 12) is rocked and latched in its upper position (not shown), during the first restore clutch cycle in division, the spring 447, although tensioned, is not capable of rocking the bell crank sufficiently at this time to initiate a clearance and tabulated shift due to the fact that the lever 397 (Figure 22) remains rocked in a clockwise position with the roller 399 underlying the legs 400 and 400a of clearance bell cranks 186 and 186 throughout the division performance as has appeared hereinbefore, and therefore, through the link 185 (Figure 23) bail 179 and lug 450a (Figure 12), the bell crank 448 is prevented from being rocked sufficiently to initiate any clearance operation.

As the division performance is terminated, either as a consequence to movement of the carriage to its leftmost position or upon depression of the stop key 935 (Figure 1), the lever 397 (Figure 22) is allowed to rock counter-clockwise under action of the tension spring 392 to rock the switch control arm 388 to open the motor circuit switch. Therefore, the roller 399 passes in front of the leg 400a of the accumulator clear bell crank 186 allowing the spring 447 to collapse, rocking the bell crank 448 to completely rock the accumulator clear bail 179 and initiate clearance of the accumulator. As the bell crank 448 is rocked by spring 447 it also acts through the arm 453 (Figure 20) to engage the pin 454 on the keyboard clear bail arm 141 so as to rock the bail 125 and release any depressed value keys.

The pin 451 on bell crank 448 at this time also rocks the tabulator bail 237 (Figure 19) to rock the trip lever 242 and, through the trigger 243, trip the starting lever 252 which, as described hereinbefore, draws the T member 1292 downwardly to engage either ear 262 or 263 of the lever 260 (Figure 24) and rock the lever one way or another in an attempt to operate the shift linkage of Figure 24. However, in view of the fact that the lever 397 is now blocked from rocking clockwise during the clearance operation by virtue of the fact that the link 400a (Figure 22) extends behind the roller 399 and thus prevents movement of link 404, crank 402, link 1412, and the centralizer 1410, the compression spring 1490 (Figure 24) will yield until completion of the clearance at which time lever 397 will be freed to allow the centralizer 1410 (Figure 24) to be rocked by the shift linkage and the spring 1490 will expand to operate the shift linkage and institute a carriage shift operation.

Near the end of its counter-clockwise rocking movement, the bell crank 448 (Figure 12) strikes the under surface of an ear 460 on the latch 427 and rocks the same clockwise to release the lever 412 so that it can assume its illustrated position.

The above operation has been described on the assumption that the accumulator clear key 373 has not been latched down in the manner described in the preceding section. If this key has been latched in its depressed position a somewhat different operation of the clearance mechanism is performed so as to effect clearance of the accumulator register regardless of whether or not the key 373 is latched down. Pivoted at 456 to the leftmost end of the lever 412 (Figure 12) is an arm 457 having a stud 459 mounted thereon. The arm 457 is normally held against an ear 461 of the lever 412 by a tension spring 465 extending between the arm and the lever 412.

It will be recalled that when the key 373 (Figure 13) is latched in a depressed position the lever 182 (Figure 12) and the accumulator clear bail 179, are both held latched a certain amount clockwise from their illustrated position and therefore a shoulder 458 on the lever 182 extends in the path of movement of the stud 459. As the lever 412 moves upward during the first restore clutch cycle, the stud 459 engages the shoulder 458, rocking the lever 182 and bail 179 counter-clockwise against the action of the tension spring 176 (Figure 13) until they assume their normal illustrated position at which time the stud 183a on the bail arm 180 (Figure 23) is disposed in the upwardly extending leg of the aperture 184a in the link 185, the link dropping by gravity into its illustrated position. As the lever 412 continues upward, the stud 459 passes above the shoulder 458 and the spring 176 (Figure 13) becomes effective to yieldably urge the lever 177 and clear bail 179 clockwise, being restricted by the interlock lever 397 (Figure 22) until completion of the division performance.

It will be noted that since the arm 453 (Figure 20), rocked by the bell crank 448, strikes the pin 454 on the keyboard clear bail arm 141, the keyboard will be cleared at the end of a division performance regardless of whether or not the key 122 is latched in its depressed position.

Means are preferably provided to automatically prevent clearance of the counter register at the end of division even though the upper dial clear key 1910 is not latched depressed at this time, thereby obviating the necessity of latching the key 1910 depressed whenever conditioning the machine for a division performance. This means (Figure 19A) comprises an arm 986 fixedly keyed to the shaft 230 and having an ear 987 thereon in front of which a lever 988 pivoted on the stud 449 independently of the bell crank 448 is adapted to be positioned. A light tension spring 990 extending between the machine frame and the lever 988 normally holds the lever in its illustrated position wherein it abuts an ear 991 on the bell crank 448. When the parts are in their positions illustrated in Figure 19A, the arm 986 is free to be moved clockwise through its path of movement on rocking of the shaft 230 by the mechanism illustrated in Figure 21 to effect operation of any of the clearance mechanisms. However, when, at the end of a division performance, the spring 447 is allowed to rock the bell crank 448 counter-clockwise and thereby initiate a tabulated shift of the carriage and clearance of the accumulator register and keyboard, as hereinbefore described, the ear 991 on the bell crank 448 rocks the lever 988 counter-clockwise against the action of the spring 990 to position a blocking surface 992 thereon under the ear 987 of arm 986, and thus prevent rocking of the shaft 230 by the mechanism of Figure 21 (following tripping of the tabulation initiating mechanism of Figure 19 by the bell crank 448) sufficiently to rock the lever 157 (Figure 15) and the counter clearance initiating bail 153 to initiate clearance of the counter register. It should be understood that the above sequence of operation is made possible by virtue of the fact that a certain amount of time lag occurs between the rocking of bell crank 448 by the spring 447 and the rocking of shaft 230. This is so because the bell crank 448 must effect sequential operation of a relatively large number of levers and latches before the spring 193 (Figure 21) can attempt to rock the shaft 230, and therefore, the arm 988 has time to safely rock into blocking relation with the lever 986 before the shaft 230 attempts to rock.

As the lever 988 is rocked counter-clockwise a tip 989 thereon moves under the ear 987 and therefore, even though the tension of the spring 447 is released shortly after initiation of operation of the tabulator and clearance initiating mechanisms to enable the bell crank 448 to be returned to its illustrated position by spring 990, the tip 989 will engage the ear 987 of the arm 986 and prevent the spring 990 from retracting the lever 988 from blocking position until the shaft 230 is returned counter-clockwise under the urge of the spring 156 (Figure 15) and spring 183 (Figure 12). This occurs during the setting clutch cycle of a succeeding machine operation at which time the lever 1191 (Figure 21) is latched against operation by the spring 193 as described hereinbefore.

I claim:

1. In a calculating machine having a normalizing mechanism, actuating means therefor comprising a manually depressible key; and power operated actuating means for said normalizing mechanism; the combination of a manually operable disabling member operable independently of said key, means controlled by said disabling member for inhibiting actuation of said mechanism by the means which comprises said depressible key, and means adjustable by said key upon depression thereof for inhibiting actuation of said mechanism by said power operated means.

2. In a calculating machine having a plurality of normalizing mechanisms, respective actuating means therefor each comprising a manually depressible key, and a power operated actuating means common to said mechanisms; the combination of a manually operable disabling member operable independently of said keys, means controlled by said disabling member for inhibiting actuation of said mechanisms by the respective means which comprise said depressible keys, and separate means adjustable by each of said keys, respectively, upon depression thereof for inhibiting actuation of the associated one of said respective mechanisms by said power operated means.

3. In a calculating machine having a normalizing mechanism, actuating means therefor comprising a manually depressible key; and power operated actuating means for said normalizing mechanism; the combination of a manually operable disabling member operable independently of said key, means controlled by said disabling member for inhibiting actuation of said mechanism by the means which comprises said depressible key, means adjustable by said key upon depression thereof for inhibiting actuation of said mechanism by said power operated means, and means controlled by said disabling member for holding said adjustable means adjusted so as to inhibit actuation of said mechanism by said power operated means.

4. In a calculating machine having a plurality of normalizing mechanisms, respective actuating means therefor each comprising a manually depressible key, and a power operated actuating means common to said mechanisms; the combination of a manually operable disabling member operable independently of said keys, means controlled by said disabling member for inhibiting actuation of said mechanisms by the respective means which comprise said depressible keys, separate means adjustable by each of said keys, respectively, upon depression thereof for inhibiting actuation of the associated one of said respective mechanisms by said power operated means, and means controlled by said disabling member for holding adjusted, those adjustable means which have been adjusted by their associated keys, so as to inhibit actuation of the respective mechanisms associated therewith by said power operated means.

5. In a calculating machine having a normalizing mechanism, actuating means therefor comprising a manually depressible key; and power operated actuating means for said normalizing mechanism; the combination of a manually operable disabling member operable independently of said key, means controlled by said disabling member for inhibiting actuation of said mechanism by the means which comprises said depressible key, means adjustable by said key upon depression thereof for inhibiting actuation of said mechanism by said power operated means, means controlled by said disabling member for holding said adjustable means adjusted so as to inhibit actuation of said mechanism by said power operated means, and means selectively responsive to manual control for releasing said holding means and readjusting said adjustable means so as to render the latter ineffective to inhibit actuation of said mechanism by said power operated means.

6. In a calculating machine having a plurality of normalizing mechanisms, respective actuating means therefor each comprising a manually depressible key, and a power operated actuating means common to said mechanisms; the combination of a manually operable disabling member operable independently of said keys, means controlled by said disabling member for inhibiting actuation of said mechanisms by the respective means which comprise said depressible keys, separate means adjustable by each of said keys, respectively, upon depression thereof, for inhibiting actuation of the associated one of said respective mechanisms by said power operated means, means controlled by said disabling member for holding adjusted, those adjustable means which have been adjusted by their associated keys, so as to inhibit actuation of the respective mechanism associated therewith by said power operated means, and separate means each selectively responsive to manual control to release its associated adjustable means from said holding means and to readjust the same so as to render it ineffective to inhibit actuation of the associated one of said mechanisms by said power operated means.

7. In a calculating machine having a normalizing mechanism, actuating means therefor comprising a manually depressible key; and power operated actuating means for said normalizing mechanism; the combination of a manually operable disabling member operable independently of said key, means controlled by said disabling member for inhibiting actuation of said mechanism by the means which comprises said depressible key, means adjustable by said key upon depression thereof for inhibiting actuation of said mechanism by said power operated means, means controlled by said disabling member for holding said adjustable means adjusted so as to inhibit actuation of said mechanism by said power operated means, and means controlled by said key upon further depression thereof for releasing said holding means and readjusting said adjustable means so as to render the latter ineffective to inhibit actuation of said mechanism by said power operated means.

8. In a calculating machine having a plurality of normalizing mechanisms, respective actuating means therefor each comprising a manually depressible key, and a power operated actuating means common to said mechanisms; the combination of a manually operable disabling member operable independently of said keys, means controlled by said disabling member for inhibiting actuation of said mechanisms by the respective means which comprises said depressible keys, separate means adjustable by each of said keys, respectively, upon depression thereof for inhibiting actuation of the associated one of said respective mechanisms by said power operated means, means controlled by said disabling member for holding adjusted, those adjustable means which have been adjusted by their associated keys, so as to inhibit actuation of the respective mechanisms associated therewith by said power operated means, and separate means each controlled by its respective key upon further depression thereof for selectively releasing its associated adjustable means from said holding means and readjusting the same so as to render it ineffective to inhibit actuation of the associated one of said mechanisms by said power operated means.

9. In a calculating machine having a transversely shiftable carriage; the combination with carriage shifting means including an element for initiating operation thereof; normalizing mechanism, actuating means for said mechanism comprising a manually depressible key; and power operated actuating means for said mechanism controlled by said element; of a manually operable disabling member operable independently of said key, means controlled by said disabling member for inhibiting actuation of said mechanism by the means which comprises said depressible key, and means adjustable by said key upon depression thereof for inhibiting actuation of said mechanism by said power operated means.

10. In a calculating machine having a transversely shiftable carriage; the combination with carriage shifting means including an element for initiating operation thereof; a plurality of normalizing mechanisms, respective actuating means for said mechanisms each comprising a manually depressible key; and a power operated actuating means common to said mechanisms and controlled by said element; of a manually operable disabling member operable independently of said keys, means controlled by said disabling member for inhibiting actuation of said mechanisms by the respective means which comprise said depressible keys, and separate means each adjustable by its respective key upon depression thereof for inhibiting actuation of the associated one of said respective mechanisms by said power operated means.

11. In a calculating machine having a transversely shiftable carriage; the combination with carriage shifting means including an element for initiating operation thereof; normalizing mechanism, actuating means for said mechanism comprising a manually depressible key; and power operated actuating means for said mechanism controlled by said element; of a manually operable disabling member operable independently of said key, means controlled by said disabling member for inhibiting actuation of said mechanism by the means which comprises said depressible key, means adjustable by said key for inhibiting actuation of said mechanism by said power operated means, and means controlled by said disabling member for holding said adjustable means adjusted so as to inhibit actuation of said mechanism by said power operated means.

12. In a calculating machine having a transversely shiftable carriage; the combination with carriage shifting means including an element for initiating operation thereof; a plurality of normalizing mechanisms, respective actuating means for said mechanisms each comprising a manually depressible key; and a power operated actuating means common to said mechanisms and controlled by said element; of a manually operable disabling member operable independently of said keys, means controlled by said disabling member for inhibiting actuation of said mechanisms by the respective means which comprise said depressible keys, separate means each adjustable by its respective key upon depression thereof, for inhibiting actuation of the associated one of said respective mechanisms by said power operated means, and means controlled by said disabling member for holding adjusted, those adjustable means which have been adjusted by their associated keys so as to inhibit actuation of the respective mechanisms associated therewith by said power operated means.

13. In a calculating machine having a transversely shiftable carriage; the combination with carriage shifting means including an element for initiating operation thereof; normalizing mechanism, actuating means for said mechanism comprising a manually depressible key; and power operated actuating means for said mechanism controlled by said element; of a manually operable disabling member operable independently of said key, means controlled by said disabling member for inhibiting actuation of said mechanism by the means which comprises said depressible key, means adjustable by said key upon depression thereof for inhibiting actuation of said mechanism by said power operated means, means controlled by said disabling member for holding said adjustable means adjusted so as to inhibit actuation of said mechanism by said power operated means, and means selectively responsive to manual control for releasing said holding means and readjusting said adjustable means so as to render the latter ineffective to inhibit actuation of said mechanism by said power operated means.

14. In a calculating machine having a transversely shiftable carriage; the combination with carriage shifting means including an element for initiating operation thereof; a plurality of normalizing mechanisms, respective actuating means for said mechanism each comprising a manually depressible key; and power operated actuating means common to said mechanisms and controlled by said element; of a manually operable disabling member operable independently of said keys, means controlled by said disabling member for inhibiting actuation of said mechanisms by the respective means which comprise said depressible keys, separate means each adjustable by its respective key upon depression thereof for inhibiting actuation of the associated one of said respective mechanisms by said power operated means, means controlled by said disabling member for holding adjusted, those adjustable means which have been adjusted by their associated keys, so as to inhibit actuation of the respective mechanisms associated therewith by said power operated means, and separate means each selectively responsive to manual control to release its respective adjustable means from said holding means and to readjust the same so as to render it ineffective to inhibit actuation of the associated one of said mechanisms by said power operated means.

15. In a motor driven calculating machine having a carriage transversely shiftable to any of a series of operating positions, motor driven means for shifting said carriage, registering mechanism and a resetting device therefor carried by said carriage; the combination with operating mechanism for said resetting device including means for effecting a driving connection between the motor and the resetting device while the carriage is in any of said series of operating positions; and carriage shift control mechanism including means for initiating operation of said carriage shifting means and means for arresting operation thereof so as to position said carriage in any of said operating positions; of a device conditioned by said carriage shift operation initiating means for initiating actuation of the operating mechanism for said resetting device; means operable under control of said carriage shift control mechanism for delaying operation of said conditioned initiating device, and means controlled by said arresting means for rendering the last mentioned means ineffective to delay operation of said operating mechanism.

16. In a motor driven calculating machine, the combination with normalizing mechanism including an actuating means therefor; a manual operating device movable to active position and effective upon such movement to operate said actuating means, an automatic operating device deriving power from the motor and movable to active position; said automatic operating device being normally effective upon movement to active position to operate said actuating means, means for returning said actuating means to normal position, means controlled by said manual operating device upon movement thereof to active position for rendering said returning means effective and elements adjustable to inhibit operation of said actuating means by said automatic operating device while said manual operating device remains in active position; of a member movable to effective position and a latching device adjustable by said member for holding said adjustable elements in position to inhibit operation of said actuating means by said automatic operating device.

17. In a motor driven calculating machine, the combination with a plurality of normalizing mechanisms each including an actuating means therefor; a plurality of manual operating devices each movable to active position and effective upon such movement to operate a respective one of said actuating means, an automatic operating device deriving power from the motor and movable to active position; said automatic operating device being normally effective upon movement to active position to operate all of said actuating means, means for returning said actuating means to normal position, means controlled by each of said manual operating devices upon movement to active position for rendering the respective returning means effective; said means including elements adjustable to inhibit operation of said actuating means by said automatic operating device while the associated manual operating device remains in active position; of a member movable to effective position and a plurality of latching devices adjustable by said member for holding in position to inhibit operation of the associated actuating means by the automatic operating device such of said adjustable elements as have been so adjusted, while permitting operation of the remaining actuating means by the automatic actuating device.

18. In a machine of the class desecribed having a plurality of depressible keys and spring means for returning each of said keys to raised position; the combination of settable latches individual to each of said keys for retaining each of said keys in depressed position, spring means normally effective to hold any or all of said latches in ineffective position, means comprising a manually adjustable member for moving said latches collectively to effective position, and cooperating means on each of said keys and each of said latches, respectively, and engageable when any key is depressed and said latches are in effective position, for retaining any one or more of said latches in effective position while permitting the return of others of said latches to ineffective position.

19. In a machine of the class described having a plurality of depressible keys and spring means for returning each of said keys to raised position; the combination of settable latches individual to each of said keys for retaining each of said keys in depressed position, spring means normally effective to hold any or all of said latches in ineffective position, means comprising a manually adjustable member for moving said latches collectively to effective position, and cooperating means on each of said keys and each of said latches, respectively, and engageable when any key is depressed and said latches are in effective position, for retaining any one or more of said latches in effective position while permitting the return of others of said latches to ineffective position; said last mentioned spring means being responsive to depression of a latched key beyond latched position to return the latch associated therewith to ineffective position.

20. In a calculating machine having a plurality of normalizing mechanisms, respective actuating means therefor each comprising a manually depressible key, and a power operated actuating means common to said mechanisms; the combination of manually operable devices comprising, means individual to each of said keys each adjustable from normal position to inhibiting position; said individual means each being effective upon such adjustment thereof to inhibit actuation of its associated one of said normalizing mechanisms by said power operated means, means for holding in said inhibiting position any one or more of said individual means which are adjusted as aforesaid and means common to all of said holding means and selectively adjustable to render the same effective or ineffective.

21. In a calculating machine having a transversely shiftable carriage; the combination with carriage shifting means including an element for initiating operation thereof; of a normalizing mechanism, power energized spring means operable to initiate operation of said normalizing mechanism, a latch for holding said spring means in energized condition, means operable under control of said element as an incident to the initiation of operation of said shifting means for releasing said latch from said spring means, and holding means controlled by said carriage shifting means during the operation thereof for delaying initiation of the operation of said normalizing mechanism by said spring means.

22. In a calculating machine having a plurality of normalizing mechanisms, respective actuating means therefor each comprising one of a series of depressible keys juxtaposed for simultaneous manual operation and spring means for returning each of said keys to raised position; the combination of settable latches individual to each of said keys movable to effective position for retaining each of said keys in depressed position, spring means normally effective to hold any or all of said latches in ineffective position, means comprising a manually adjustable disabling member for moving said latches collectively to effective position, means controlled by said disabling member for inhibiting actuation of said mechanisms by the respective actuating means therefor which comprise said depressible keys, and cooperating means on each of said keys and each of said latches, respectively, and engageable when any key is depressed and said latches are in effective position, for retaining the latches associated with such keys as are depressed in effective position while permitting the return of others of said latches to ineffective position.

23. In a calculating machine having a plurality of normalizing mechanisms, separate actuating means therefor, and power operated means for operating said actuating means; the combination of manually operable devices comprising depressible keys for operating the respective actuating means, means for adjusting said actuating means to disabled condition to render said operating means ineffective to actuate said normalizing mechanisms, and means for holding any selected ones of said keys depressed to maintain their respective actuating means in such disabled condition.

24. In a calculating machine having a plurality of operable mechanisms, each possessing an individual control train capable of being actuated to cause operation of its respective mechanism, a plurality of keys each operable to actuate its respective train and a master control element adapted to cause simultaneous actuation of all of said trains; the combination of a member adjustable to disable all of said trains, with a plurality of devices each individual to a respective train and each adjustable under the joint control of the member and the associated key to maintain the respective train in disabled condition.

25. In a calculating machine having a plurality of normalizing mechanisms, each possessing an individual control key therefor, and a master control key to cause simultaneous operation of all of said normalizing mechanisms; the combination of a disabling member adjustable to suspend operative relationship between all of said individual control keys and their respective normalizing mechanisms, with devices individual to each of said normalizing mechanisms and adjustable by the respective control keys to individually suspend operative relationship between their normalizing mechanisms and said master control key.

26. In a calculating machine having a plurality of normalizing mechanisms, each possessing its individual control key therefor, and a master control key to cause simultaneous operation of all of said normalizing mechanisms; the combination of a disabling member adjustable from a position of rest to an active position for suspending operative relationship between all of said individual control keys and their respective normalizing mechanisms, with devices individual to said normalizing mechanisms and individually adjustable by depression of the respective control keys, when said disabling member is in active position, to suspend operative relationship between their associated normalizing mechanisms and said master control key, and latching means thereupon responsive to release said keys to maintain the devices thus adjusted in operation-suspending condition after subsequent return of said disabling member to its position of rest.

27. Arrangement according to claim 26 wherein said individual control keys are operable, upon further depression, to cause selective release of said latching means.

HAROLD T. AVERY.

REFERENCES CITED

The following references are of record in the file of this patent:

UNITED STATES PATENTS

| Number | Name | Date |
|---|---|---|
| 2,294,948 | Avery | Sept. 8, 1942 |
| 2,010,068 | Duke | Aug. 6, 1935 |
| 2,294,083 | Friden | Aug. 25, 1942 |
| 1,750,565 | Britten, Jr | Mar. 11, 1930 |
| 2,096,465 | Overbury | Oct. 19, 1937 |
| 2,186,642 | Kammel | Jan. 9, 1940 |
| 2,264,582 | Petit | Dec. 2, 1941 |
| 1,344,191 | Teetor | June 22, 1940 |
| 1,761,571 | Kropff | June 3, 1930 |
| 1,761,547 | Tyler | June 3, 1930 |
| 1,792,391 | Overbury | Feb. 10, 1931 |
| 2,059,652 | Pott | Nov. 3, 1936 |
| 2,227,785 | Kottmann | Jan. 7, 1941 |

OTHER REFERENCES

"Last Word in Automatic Multiplication"; pub. Marchant Calculating Machine Co., 1939.